United States Patent
Onozuka et al.

(10) Patent No.: US 12,406,693 B2
(45) Date of Patent: Sep. 2, 2025

(54) MAGNETIC TAPE, MAGNETIC TAPE CARTRIDGE, AND MAGNETIC TAPE APPARATUS

(71) Applicant: FUJIFILM Corporation, Tokyo (JP)

(72) Inventors: Nobuhito Onozuka, Minamiashigara (JP); Norihito Kasada, Minamiashigara (JP); Ryosuke Yumiyama, Minamiashigara (JP); Junya Sawada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/758,961

(22) Filed: Jun. 28, 2024

(65) Prior Publication Data

US 2025/0014600 A1    Jan. 9, 2025

(30) Foreign Application Priority Data

Jun. 30, 2023   (JP) ................... 2023-107625
Jun. 26, 2024   (JP) ................... 2024-103229

(51) Int. Cl.
*G11B 5/73*     (2006.01)
*G11B 5/588*    (2006.01)

(52) U.S. Cl.
CPC .......... *G11B 5/736* (2019.05); *G11B 5/588* (2013.01)

(58) Field of Classification Search
None
See application file for complete search history.

(56) References Cited

U.S. PATENT DOCUMENTS

| | | | | |
|---|---|---|---|---|
| 6,610,424 B1* | 8/2003 | Acharya | ........... | G11B 5/672 |
| | | | | 428/829 |
| 6,620,531 B1* | 9/2003 | Cheng | ........... | G11B 5/8404 |
| | | | | 427/130 |
| 2003/0108772 A1* | 6/2003 | Noguchi | ........... | G11B 5/70 |
| 2003/0113586 A1* | 6/2003 | Mori | ........... | G11B 5/70678 |
| 2003/0157373 A1* | 8/2003 | Kirino | ........... | G11B 5/657 |
| | | | | 428/833.1 |
| 2003/0198832 A1* | 10/2003 | Nakamura | ........... | G11B 5/737 |
| | | | | 428/831.2 |
| 2014/0327987 A1 | 11/2014 | Biskeborn et al. | | |
| 2019/0164573 A1 | 5/2019 | Biskeborn | | |
| 2020/0342907 A1 | 10/2020 | Yamaga et al. | | |
| 2025/0014600 A1* | 1/2025 | Onozuka | ........... | G11B 5/7356 |
| 2025/0014602 A1* | 1/2025 | Onozuka | ........... | G11B 5/588 |

FOREIGN PATENT DOCUMENTS

JP    2016-524774 A    8/2016
JP        6590102 B1   10/2019

* cited by examiner

*Primary Examiner* — Peter Vincent Agustin
(74) *Attorney, Agent, or Firm* — Sughrue Mion, PLLC

(57) ABSTRACT

The magnetic tape includes a non-magnetic support, and a magnetic layer containing a ferromagnetic powder. A magnetic tape cartridge and a magnetic tape apparatus include the magnetic tape. VIVA 0.1, which is a height that is obtained by measuring a surface of the magnetic layer with an atomic force microscope and at which a cross-sectional area is 0.1% with a measurement region area as 100%, is 5 nm or more and 10 nm or less, and standard deviation σ of the VIVA 0.1 in a width direction of the surface of the magnetic layer is 1.0 nm or less.

17 Claims, 9 Drawing Sheets

RUNNING DIRECTION OF MAGNETIC TAPE

MAGNETIC TAPE, MAGNETIC TAPE CARTRIDGE, AND MAGNETIC TAPE APPARATUS

CROSS-REFERENCE TO RELATED APPLICATIONS

This application claims priority under 35 U.S.C 119 to Japanese Patent Application No. 2023-107625 filed on Jun. 30, 2023 and Japanese Patent Application No. 2024-103229 filed on Jun. 26, 2024. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

There are two types of magnetic recording media: a tape shape and a disk shape, and a tape-shaped magnetic recording medium, that is, a magnetic tape is mainly used for data storage applications such as data backup and archiving (for example, see JP2016-524774A, US2019/0164573A1, and JP6590102B).

SUMMARY OF THE INVENTION

Recording of data on a magnetic tape is usually performed by running the magnetic tape in a magnetic tape apparatus (generally called a "drive") and recording the data on a data band by making a magnetic head follow the data band of the magnetic tape. Thereby, a data track is formed in the data band. In addition, in a case where the recorded data is reproduced, the data recorded on the data band is read by running the magnetic tape in the magnetic tape apparatus and by making the magnetic head follow the data band of the magnetic tape. After such recording or reproduction, the magnetic tape is usually stored in a state of being wound around a reel inside a magnetic tape cartridge until the next recording and/or reproduction is performed.

In order to increase an accuracy of the magnetic head following the data band of the magnetic tape in recording and/or reproduction as described above, a system for performing head tracking using a servo signal (hereinafter, it is described as a "servo system") has been put into practical use. However, in a case where recording and/or reproduction is performed after the above-mentioned storage, tape width deformation of the magnetic tape caused by the storage may cause a phenomenon (generally called "off-track") in which the magnetic head for recording and/or reproducing the data deviates from a target track position. In a case where overwriting of the recorded data, reproduction failure, or the like occurs due to off-track, operational stability of the drive may deteriorate. In recent years, off-track is more likely to occur due to an increase in track density associated with an increase in capacity of the magnetic tape, so that an increasing need to improve the operational stability of the drive has been made. On the other hand, in recent years, in the field of data storage, long-term storage of data, which is called archive, has been performed. However, in general, the longer the storage period, the more likely the tape width deformation of the magnetic tape is to occur, and an occurrence frequency of the off-track tends to increase.

In view of the above, an object of an aspect of the present invention is to provide a magnetic tape that can contribute to improvement of operational stability of a drive in recording and/or reproduction after long-term storage.

One aspect of the present invention is as follows.

[1] A magnetic tape comprising: a non-magnetic support; and a magnetic layer containing a ferromagnetic powder, in which VIVA 0.1 (hereinafter, also referred to as "VIVA 0.1 of a magnetic layer surface" or simply "VIVA 0.1"), which is a height that is obtained by measuring a surface of the magnetic layer with an atomic force microscope and at which a cross-sectional area is 0.1% with a measurement region area as 100%, is 5 nm or more and 10 nm or less, and standard deviation σ of the VIVA 0.1 in a width direction of the surface of the magnetic layer (hereinafter, also referred to as a "width direction σ of VIVA 0.1") is 1.0 nm or less.

[2] The magnetic tape according to [1], in which the standard deviation σ of the VIVA 0.1 is 0.7 nm or less.

[3] The magnetic tape according to [1] or [2], in which the magnetic layer further contains a non-magnetic powder having an average plate diameter of 50 nm or more and 1,000 nm or less and an average plate thickness of 12 nm or less.

[4] The magnetic tape according to any one of [1] to [3], further comprising: a non-magnetic layer containing a non-magnetic powder between the non-magnetic support and the magnetic layer.

[5] The magnetic tape according to [4], in which the non-magnetic powder of the non-magnetic layer includes an Fe-based inorganic oxide powder having an average particle volume of $2.0 \times 10^{-6}$ μm$^3$ or less.

[6] The magnetic tape according to [4] or [5], in which the non-magnetic powder of the non-magnetic layer includes carbon black having a pH of 9.0 or less.

[7] The magnetic tape according to any one of [4] to [6], in which a thickness of the non-magnetic layer is 0.1 μm or more and 0.7 μm or less.

[8] The magnetic tape according to any one of [1] to [7], further comprising: a back coating layer containing a non-magnetic powder on a surface side of the non-magnetic support opposite to a surface side having the magnetic layer.

[9] The magnetic tape according to any one of [1] to [8], in which a tape thickness is 5.2 μm or less.

[10] The magnetic tape according to any one of [1] to [9], in which a tape thickness is 5.0 μm or less.

[11] The magnetic tape according to any one of [1] to [10], in which a vertical squareness ratio of the magnetic tape is 0.60 or more.

[12] The magnetic tape according to any one of [1] to [11], in which a vertical squareness ratio of the magnetic tape is 0.65 or more.

[13] The magnetic tape according to any one of [1] to [12], in which the non-magnetic support is an aromatic polyamide support.

[14] The magnetic tape according to any one of [1] to [13], in which the standard deviation σ of the VIVA 0.1 is 0.7 nm or less, the magnetic layer further contains a non-magnetic powder having an average plate diameter of 50 nm or more and 1,000 nm or less and an average plate thickness of 12 nm or less, the magnetic tape further includes a non-magnetic layer containing a non-magnetic powder between the non-magnetic support and the magnetic layer, the non-magnetic powder of the non-magnetic layer includes an Fe-based inorganic oxide powder having an average particle volume of $2.0 \times 10^{-6}$ μm$^3$ or less and carbon black having a pH of 9.0 or less, a thickness of the non-magnetic layer is 0.1 μm or more and 0.7 μm or less, the magnetic tape further includes a back coating layer containing a non-magnetic powder on a surface side of the non-magnetic support opposite to a surface side having the magnetic layer, a tape thickness is 5.0 μm or less, and a vertical squareness ratio of the magnetic tape is 0.65 or more.

[15] A magnetic tape cartridge comprising: the magnetic tape according to any one of [1] to [14].

[16] A magnetic tape apparatus comprising: the magnetic tape according to any one of [1] to [14].

[17] The magnetic tape apparatus according to [16], further comprising: a magnetic head, in which the magnetic head has a module including an element array with a plurality of magnetic head elements between a pair of servo signal reading elements, and the magnetic tape apparatus changes an angle θ formed by an axis of the element array with respect to a width direction of the magnetic tape during running of the magnetic tape in the magnetic tape apparatus.

According to one aspect of the present invention, it is possible to provide a magnetic tape that can contribute to improvement of operational stability of a drive in recording and/or reproduction after long-term storage. In addition, according to one aspect of the present invention, it is possible to provide a magnetic tape cartridge and a magnetic tape apparatus which include the magnetic tape.

DESCRIPTION OF THE PREFERRED EMBODIMENTS

Magnetic Tape

Figure 1:
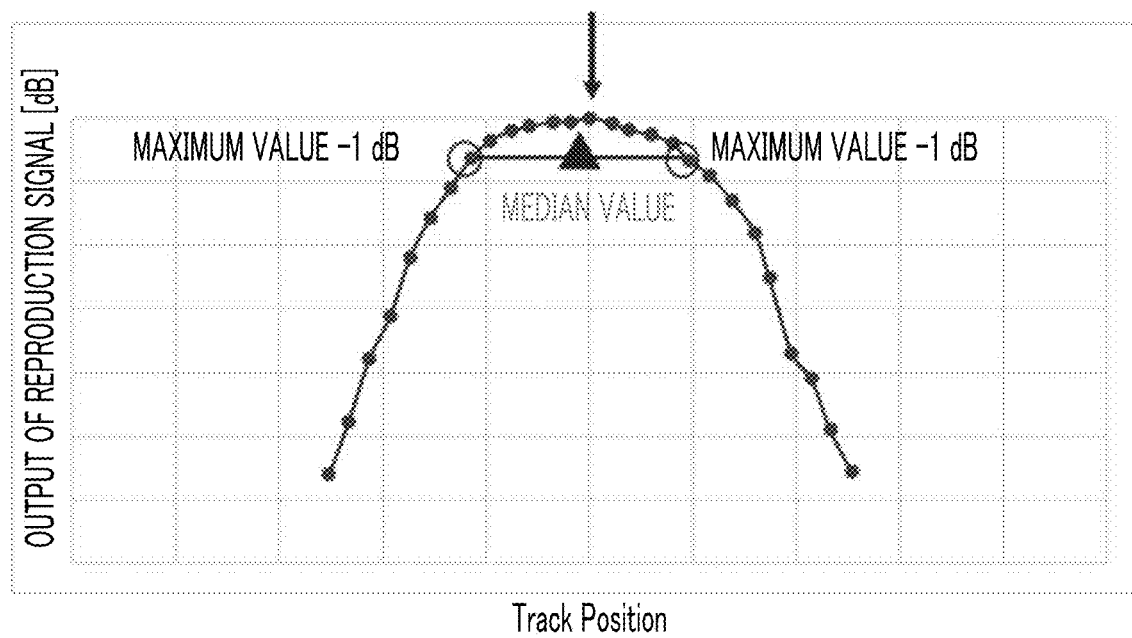
FIG. 1 shows an example of a track profile in which plotting is performed, where a horizontal axis represents a track position and a vertical axis represents an output of a reproduction signal.

One aspect of the present invention relates to a magnetic tape including a non-magnetic support and a magnetic layer containing a ferromagnetic powder. In the magnetic tape, VIVA 0.1, which is a height that is obtained by measuring a surface of the magnetic layer with an atomic force microscope and at which a cross-sectional area is 0.1% with a measurement region area as 100%, is 5 nm or more and 10 nm or less, and standard deviation σ of the VIVA 0.1 in a width direction of the surface of the magnetic layer is 1.0 nm or less.

As a result of extensive studies, the present inventor has newly found that a magnetic tape in which the VIVA 0.1 of the magnetic layer surface is in the above range and the width direction σ of the VIVA 0.1 is in the above range can contribute to improvement of operational stability of a drive. Hereinafter, supposition of the present inventor regarding this point is described. Note that the present invention is not limited to the supposition described in the present specification.

As described above, the tape width deformation generated by the long-term storage may cause a decrease in operational stability of the magnetic tape in the drive. In this regard, in recent years, it has been proposed to acquire information on dimensions in a width direction of the magnetic tape during running by using a servo signal and to change an angle (hereinafter, also referred to as a "head tilt angle") at which an axial direction of a module of a magnetic head is tilted against the width direction of the magnetic tape according to the acquired dimension information (see JP2016-524774A and US2019/0164573A1, for example, paragraphs 0059 to 0067 and 0084 of JP2016-524774A). In addition, the information on the dimensions in the width direction of the magnetic tape during running is acquired using the servo signal, and a tension applied in a longitudinal direction of the magnetic tape is adjusted according to the acquired dimension information, thereby controlling the dimensions in the width direction of the magnetic tape (see, for example, a paragraph 0171 of JP6590102B). For example, control means for a dynamic track position during running of the magnetic tape as described above can be means for suppressing off-track.

However, the present inventor has made extensive studies in order to further improve the operational stability of the drive in recording and/or reproduction after long-term storage, and paid attention to the fact that there may be off-track factors for which it is difficult to compensate by the control means for the dynamic track position. Hereinafter, this point will be further described.

In a case where the dynamic track position is controlled by changing the head tilt angle, a pitch of a magnetic head element (specifically, a recording element and/or a reproducing element) changes evenly according to the head tilt angle regardless of the position in the tape width direction. In a case where the dynamic track position is controlled by adjusting the tension applied in the longitudinal direction of the magnetic tape, the tension in the entire width of the tape is usually adjusted, so that the tape width changes evenly by the tension adjustment regardless of the position in the tape width direction. In a case where a degree of the tape width deformation is homogeneous over the entire magnetic tape, that is, in a case where a tape width deformation component is only a linear component, it is possible to completely compensate for the off-track by the control means. Therefore, it is possible to completely registrate the data track and the magnetic head element. On the other hand, in a case where the degree of the tape width deformation varies depending on the position and is non-homogeneous, that is, in a case where the tape width deformation component includes a non-linear component, it is difficult to compensate for the off-track caused by the non-linear component, by the control means. The present inventor has considered that reduction in this non-linear component can contribute to suppression of the decrease in operational stability of the drive due to the off-track factor for which it is difficult to compensate by the control means for the dynamic track position. Regarding this point, the present inventor has considered that, in the magnetic tape, the VIVA 0.1 of the magnetic layer surface being in the above range and the standard deviation σ of the VIVA 0.1 being in the above range can contribute to suppression of occurrence of the non-linear component of the tape width deformation. Accordingly, the present inventor supposes that the magnetic tape can contribute to the improvement of the operational stability of the drive in the recording and/or the reproduction after the long-term storage.

VIVA 0.1 of Magnetic Layer Surface and Width Direction σ of VIVA 0.1

In the present invention and the present specification, VIVA 0.1 is a height that is obtained by measuring a surface of the magnetic layer with an atomic force microscope and at which a cross-sectional area is 0.1% with a measurement region area as 100%. The abbreviation "VIVA" is used as an abbreviation of "virtual interface visualization analysis".

In order to obtain VIVA 0.1 of the magnetic layer surface, as described below, the measurement is performed on the surface of the magnetic layer of the magnetic tape using an atomic force microscope (AFM). In the present invention and the present specification, the term "magnetic layer surface (surface of the magnetic layer)" has the same meaning as the surface of the magnetic tape on the magnetic layer side.

The measurement region is a region of 40 μm square (40 μm×40 μm). The measurement is executed at five points. The five points where measurement on the magnetic layer surface is performed are set to five points where longitudinal direction positions are the same but the width direction positions are different. The longitudinal direction position is randomly selected on the magnetic layer surface, the width direction is divided into five parts with respect to the magnetic tape width at this longitudinal direction position (therefore, in a case where the magnetic tape width is defined as W, the width of each division is "W/5"), and VIVA 0.1 is obtained for a region of 40 μm square (40 μm×40 μm) randomly selected in each division. Specifically, VIVA 0.1 can be obtained by analyzing the measurement results of the AFM measurement as follows using known AFM data analysis software. Examples of the AFM data analysis software include AFM data analysis software (Nanoscope Analysis) provided by BRUKER. Specifically, the analysis is performed as follows.

The cross-sectional area at each height is obtained from the measurement result of the AFM measurement by the AFM data analysis software. The cross-sectional area is an area of a cross section virtually sliced in a plane parallel to the reference surface at the height. The reference surface is a surface on which the volumes of the convex component and the concave component in the measurement region are equal in a planar image of the measurement region obtained by the AFM measurement. The height is a height specified by setting the height of the reference surface to zero. In a case where the cross section is not a continuous surface but a plurality of discontinuous surfaces, the above-described cross-sectional area is a total area of the plurality of discontinuous surfaces. In a case where the measurement region area (40 μm×40 μm) is 100%, the height at which the cross-sectional area is 0.1% is defined as VIVA 0.1 at the measurement point. In a case where there are a plurality of heights at which the cross-sectional area is 0.1%, the highest height is defined as VIVA 0.1.

As described above, VIVA 0.1 is obtained for each of the five measurement points. An arithmetic average of the five measured values thus obtained is defined as the VIVA 0.1 of the magnetic layer surface of the magnetic tape to be measured. In addition, standard deviation σ (that is, positive square root of the dispersion) of the five measured values thus obtained is defined as standard deviation σ of the VIVA 0.1 (width direction σ of VIVA 0.1) in the width direction of the surface of the magnetic layer of the magnetic tape to be measured.

The following measurement conditions can be used as an example of the AFM measurement conditions.

The region of the area of 40 μm×40 μm on the surface of the magnetic layer of the magnetic tape is measured with an AFM (Nanoscope 5 manufactured by BRUKER) in a peak fore-tapping mode. SCANASYST-AIR manufactured by BRUKER is used as a probe, a resolution is set to 512 pixels×512 pixels, and a scan speed is set to a speed at which one screen (512 pixels×512 pixels) is measured in 512 seconds.

VIVA 0.1 of Magnetic Layer Surface

The VIVA 0.1 of the magnetic layer surface of the magnetic tape is 5 nm or more and 10 nm or less.

The VIVA 0.1 of the magnetic layer surface is 5 nm or more and preferably 6 nm or more from the viewpoint of improving the operational stability of the drive in recording and/or reproduction after long-term storage. In addition, from the above viewpoint, the VIVA 0.1 of the magnetic layer surface is 10 nm or less, preferably 9 nm or less, more preferably 8 nm or less, and still more preferably 7 nm or less.

Width Direction σ of VIVA 0.1

The standard deviation σ of the VIVA 0.1 in the width direction of the surface of the magnetic layer of the magnetic tape (width direction σ of VIVA 0.1) is 1.0 nm or less, preferably 0.9 nm or less, more preferably 0.8 nm or less, still more preferably 0.7 nm or less, and still more preferably 0.6 nm or less, 0.5 nm or less, and 0.4 nm or less in this order from the viewpoint of improving the operational stability of the drive in recording and/or reproduction after long-term storage. The width direction σ of VIVA 0.1 may be, for example, 0.0 nm or more, 0.1 nm or more, or 0.2 nm or more. From the viewpoint of improving the operational stability of the drive in recording and/or reproduction after long-term storage, it is supposed that the smaller the value of the width direction σ of the VIVA 0.1 is, the more preferable it is.

A control method of the VIVA 0.1 of the magnetic layer surface and a control method of the width direction σ of the VIVA 0.1 will be described below.

Non-Linear Component of Tape Width Deformation

The present inventor considers that "the non-linear component in the tape width direction generated by storage for 10 days in an environment of a temperature of 60° C. and a relative humidity of 20%" obtained by the following method can be an index of the non-linear component of the tape width deformation described above. A storage condition of "storage for 10 days in an environment of a temperature of 60° C. and a relative humidity of 20%" is employed as an example of storage conditions in an accelerated environment corresponding to long-term storage of data called archive, and the magnetic tape is not limited to a magnetic tape that is stored under such storage conditions.

The following operation and measurement are performed in an environment of a temperature of 20° C. to 25° C. and a relative humidity of 40% to 60%, unless otherwise noted.

The magnetic tape to be measured is a magnetic tape having a length of 200 m or more.

By using a device having a winding mechanism for winding the magnetic tape by applying a tension in the longitudinal direction of the magnetic tape, the magnetic tape to be measured is wound around a magnetic tape reel having a hub diameter (outer diameter, the same applies hereinafter) of 44 mm, with a tension of 0.6 N (Newton) applied in the longitudinal direction of the magnetic tape. The magnetic tape wound around the reel in this manner is stored for 24 hours or longer in an environment where a temperature is 20° C. to 25° C. and a relative humidity is 40% to 60%, before the following measurement.

Regarding one end part and the other end part of the magnetic tape, an end part on a start point side of winding to the reel is referred to as a tape inner peripheral end part, and the other end part is referred to as a tape outer peripheral end part. The following measurement is executed in a central wrap of each data band in a region (hereinafter, referred to as "tape outer peripheral region") within 100 m from the tape outer peripheral end part and a region (hereinafter, referred to as "tape inner peripheral region") within 100 m from the tape inner peripheral end part.

The following measurement is performed using a magnetic head comprising a reproducing module including an element array with 10 channels or more of a reproducing element having an element width (specifically, a reproducing element width) of 0.2 μm or more and 1.0 μm or less between a pair of servo signal reading elements, and a recording module including an element array with 10 channels or more of a recording element having an element width (specifically, a recording element width) of 1.2 μm or more and 2.9 μm or less between a pair of servo signal reading elements. The term "element width" refers to a physical dimension of the element width, and can be measured by an optical microscope, a scanning electron microscope, or the like. In the recording module, an interval between two adjacent recording elements in the head width direction is 83.25 μm. In the reproducing module, an interval between two adjacent reproducing elements in the head width direction is 83.25 μm. The above-mentioned interval is an interval between central portions of two adjacent recording elements in the recording module, is an interval between central portions of two adjacent reproducing elements in the reproducing module, and can be measured by an optical microscope or the like. In the measurement of Examples and Comparative Examples described below, a magnetic head comprising a recording module including an element array with 32 channels (0-channel to 31-channel) of a recording element between a pair of servo signal reading elements and a reproducing module including an element array with 32 channels (0-channel to 31-channel) of a reproducing element between a pair of servo signal reading elements was used.

The reel around which the magnetic tape to be measured is wound and the magnetic head are mounted to a tape transport system of the magnetic tape apparatus to record and reproduce data. The tape transport system is mounted to a recording and reproducing amplifier capable of driving the magnetic head element (specifically, a recording element and a reproducing element) of the magnetic head. The recording and reproducing amplifier can be controlled from a personal computer (PC) via a controller. The magnetic head is mounted on an actuator (piezo motor or voice coil motor (VCM)) that operates in the tape width direction, and can be servo-followed such that the magnetic head is located at a certain track position during tape running based on a servo signal of the magnetic tape. In addition, in order to compensate for the linear component of the tape width deformation, the dynamic track position can be controlled by changing the head tilt angle of the magnetic head such that a difference between signals (PES1, PES2) of a reading position error signal (PES) in the width direction based on the servo signals obtained by two upper and lower servo signal reading elements is constant. During the following recording and reproduction, the servo-following and the dynamic track position control are executed.

Next, a direct current (DC) pattern is recorded on a first wrap, a single frequency signal of 255 kfci is recorded on a second wrap, and the DC pattern is recorded on a third wrap for three continuous wraps in which the running direction is the same while running the magnetic tape at a constant speed of 3.0 m/sec. The unit "kfci" is a unit of a linear recording density (cannot be converted into an SI unit system).

Single (shingled) recording of three or more tracks is performed such that a difference between (PES1+PES2)/2 is 1200 nm. Single recording is also called shingled magnetic recording.

Next, data is reproduced over a length of 90 m in a region (tape outer peripheral region) within 100 m from the tape outer peripheral end part and a region (tape inner peripheral region) within 100 m from the tape inner peripheral end part for the center wraps of the three continuous wraps. The reproduction signal waveform and the servo signal waveform are acquired and saved using an oscilloscope. In each measurement, the track position of the reproducing element is moved at intervals of 1/30 or less of the track pitch with respect to the tape width direction. The "output of the reproduction signal" is calculated for each reproducing element from the reproduction signal waveform acquired and saved using the above-mentioned oscilloscope, and the track position is calculated from the servo signal waveform. From these results, a track profile is created by performing plotting in which a horizontal axis represents the track position and a vertical axis represents the output of the reproduction signal. FIG. 1 shows an example of the track profile thus created.

Figure 2:
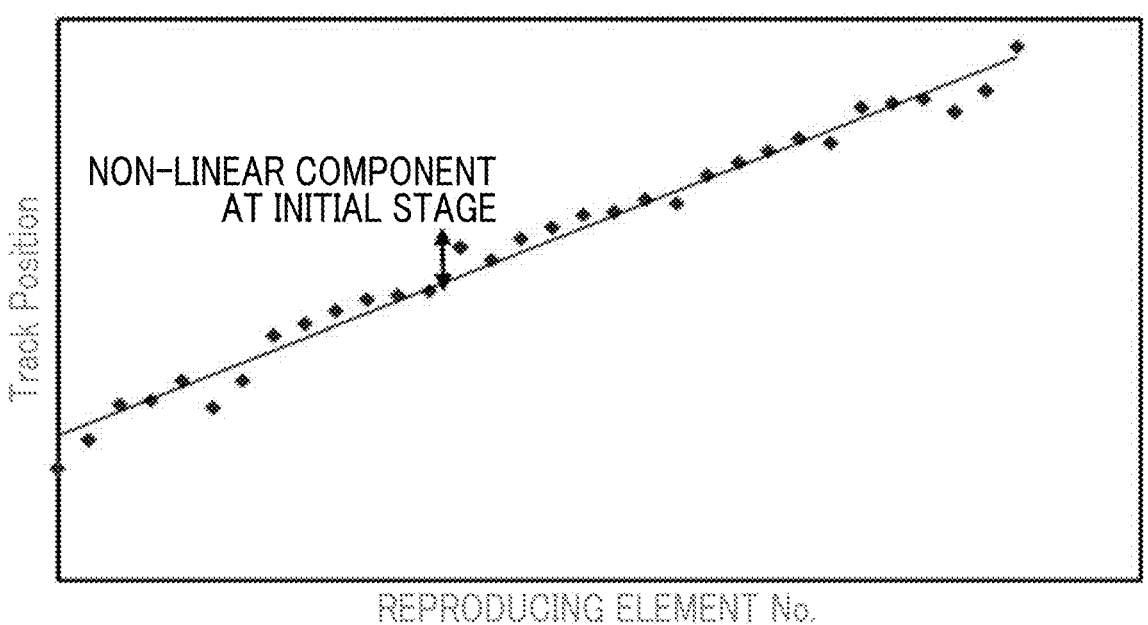
FIG. 2 shows an example of a graph relating to a non-linear component at an initial stage.

A median value between two track positions reduced by 1 dB or more from the maximum value of the output of the reproduction signal is obtained, the median value is plotted on the vertical axis for each reproducing element, and a linear approximation line is obtained by linear fitting using a least square method. For each of the tape outer peripheral region and the tape inner peripheral region, a difference between the linear approximation line and the actually measured value is obtained for each reproducing element, and the obtained difference is referred to as a "non-linear component at initial stage". FIG. 2 shows an example of a graph relating to the non-linear component at an initial stage. In the example shown in FIG. 2 and the example shown in FIG. 3 described below, the number of the reproducing elements (number of channels) is 32 channels (reproducing element number (No.): 0-channel to 31-channel).

After the measurement of the non-linear component at the initial stage, by using a device having a winding mechanism for winding the magnetic tape by applying a tension in the longitudinal direction of the magnetic tape, the magnetic tape to be measured is wound around a magnetic tape reel having a hub diameter of 44 mm, with a tension of 0.6 N applied in the longitudinal direction of the magnetic tape. In a case of such winding, winding is performed such that an end part that has served as the tape inner peripheral end part in winding around the reel before the measurement of the non-linear component at the initial stage becomes a tape inner peripheral end part. The magnetic tape wound around the reel in this manner is stored for 10 days in an environment of a temperature of 60° C. and a relative humidity of 20%.

After the above-mentioned storage, the magnetic tape to be measured is stored in an environment of a temperature of 20° C. to 25° C. and a relative humidity of 40% to 60% for 24 hours or longer (where, up to 120 hours) in a state of being wound around the reel, and then the entire length of the magnetic tape to be measured is reciprocated once (forward and reverse) using the magnetic tape apparatus used for the measurement of the non-linear component at an initial stage. Data is reproduced over a length of 90 m in a region (tape outer peripheral region) within 100 m from the tape outer peripheral end part and a region (tape inner peripheral region) within 100 m from the tape inner peripheral end part under the same recording element, reproducing element, magnetic tape apparatus, and reproduction conditions as in the above-described measurement of the non-linear component at an initial stage. The output of the reproduction signal and the servo signal waveform are acquired and saved using the same oscilloscope as in the measurement of the non-linear component at an initial stage. The track position of the reproducing element is moved in the tape width direction for each measurement at the same interval as in the above-described measurement of the non-linear component at an initial stage. The "output of the reproduction signal" is calculated for each reproducing element from the reproduction signal waveform acquired and saved using the above-mentioned oscilloscope, and the track position is calculated from the servo signal waveform. From these results, a track profile is created by performing plotting in which a horizontal axis represents the track position and a vertical axis represents the output of the reproduction signal. FIG. 1 is also an example of the track profile thus created.

Figure 3:
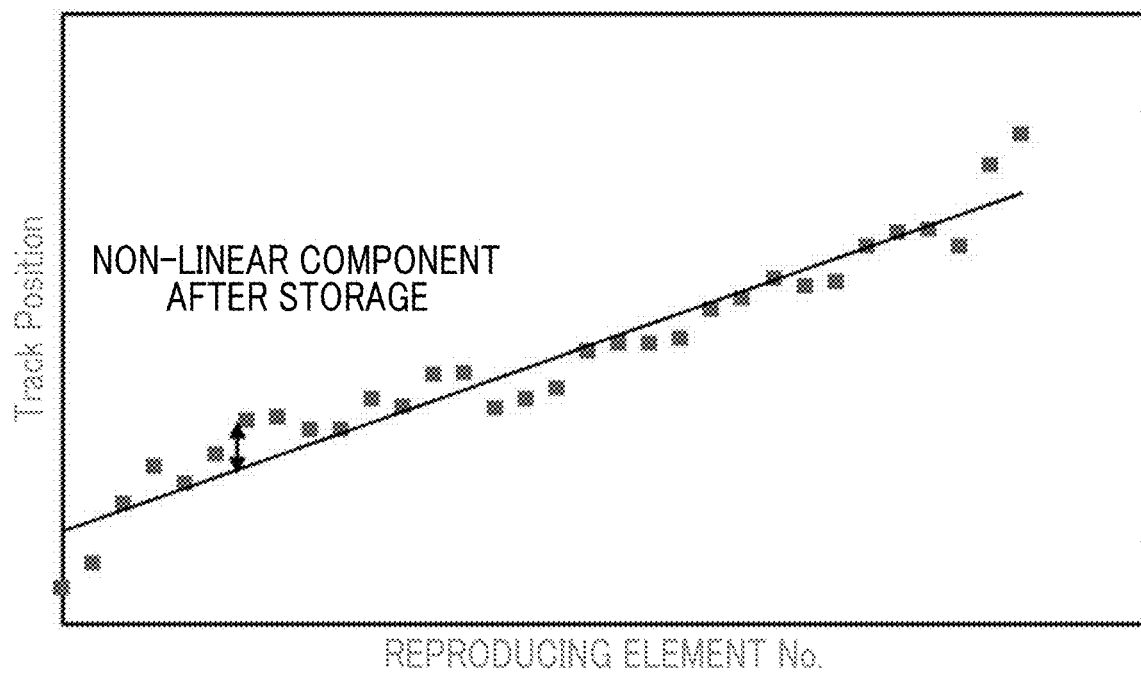
FIG. 3 shows an example of a graph relating to a non-linear component after storage.

A median value between two track positions reduced by 1 dB or more from the maximum value of the output of the reproduction signal is obtained, the median value is plotted on the vertical axis for each reproducing element, and a linear approximation line is obtained by linear fitting using a least square method. For each of the tape outer peripheral region and the tape inner peripheral region, a difference between the linear approximation line and the actually measured value is obtained for each reproducing element, and the obtained difference is referred to as a "non-linear component after storage". FIG. 3 shows an example of a graph relating to the non-linear component after storage.

Figure 4:
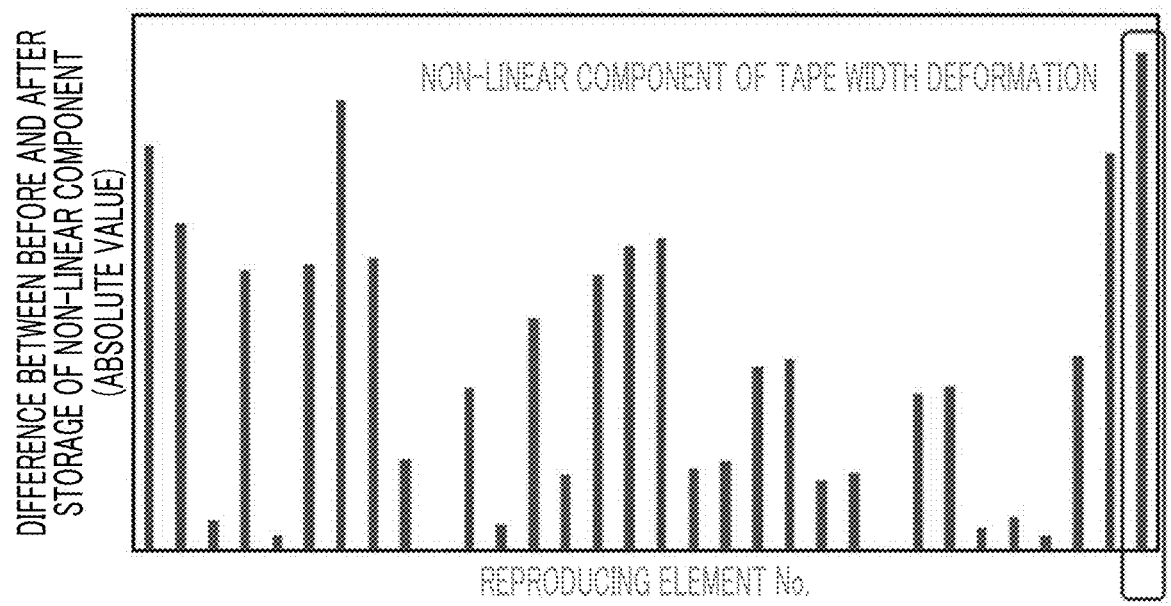
FIG. 4 is an example of a graph showing an absolute value of a difference between a non-linear component at an initial stage for each reproducing element and a non-linear component after storage (difference between before and after storage of a non-linear component), which are obtained each reproducing element.

An absolute value of a difference (difference between before and after storage of the non-linear component) between the "non-linear component at initial stage" and the "non-linear component after storage" for each reproducing element is obtained. FIG. 4 is an example of a graph showing the absolute value of the difference obtained for each reproducing element. The maximum value of the absolute value in the tape outer peripheral region and the tape inner peripheral region is defined as a "non-linear component of tape width deformation" of the magnetic tape to be measured. It is considered that the non-linear component at the initial stage can be said to be a non-linear component generated by a factor other than the magnetic tape. Therefore, the present inventor considers that it is possible to accurately evaluate the non-linear component caused by the magnetic tape by obtaining the difference between before and after storage of the non-linear component as described above.

From the viewpoint of improving the operational stability of the drive in recording and/or reproduction after long-term storage, the non-linear component of the tape width deformation obtained by the method described above for the magnetic tape is preferably 100 nm or less, more preferably 95 nm or less, and still more preferably 90 nm or less, 85 nm or less, 80 nm or less, 75 nm or less, 70 nm or less, 65 nm or less, 60 nm or less, 55 nm or less, and 50 nm or less in this order. The VIVA 0.1 of the magnetic layer surface and the width direction σ of the VIVA 0.1 being in the above-described range can contribute to controlling the value of the non-linear component in the above-described range. In addition, the non-linear component of the tape width deformation may be, for example, 0 nm or more, more than 0 nm, 1 nm or more, 5 nm or more, 10 nm or more, 15 nm or more, 20 nm or more, 25 nm or more, 30 nm or more, 35 nm or more, or 40 nm or more. From the viewpoint of improving the operational stability of the drive, a smaller non-linear component of the tape width deformation is preferable.

Description of Head Tilt Angle

As described above, one example of the control means for the dynamic track position during running of the magnetic tape is to change the head tilt angle. Regarding this point, a configuration of the magnetic head, the head tilt angle, and the like will be described below. Further, the reason why it is possible to control the dynamic track position during running of the magnetic tape by tilting the axial direction of the module of the magnetic head against the width direction of the magnetic tape during running of the magnetic tape will also be described below.

The magnetic head may have one or more modules including an element array with a plurality of magnetic head elements between a pair of servo signal reading elements, and may have two or more or three or more modules. The total number of such modules may be, for example, 5 or less, 4 or less, or 3 or less, and the modules as many as the number exceeding the total number illustrated here may be included in the magnetic head. Arrangement examples of a plurality of modules include "recording module-reproducing module" (total number of modules: 2), and "recording module-reproducing module-recording module" (total number of modules: 3). Note that the present invention is not limited to the examples shown here.

Each module can include an element array with a plurality of magnetic head elements between a pair of servo signal reading elements, that is, an arrangement of the elements. A module having a recording element as the magnetic head element is a recording module for recording data on the magnetic tape. A module having a reproducing element as the magnetic head element is a reproducing module for reproducing data recorded on the magnetic tape. In the magnetic head, a plurality of modules are arranged, for example, in a recording and reproducing head unit such that axes of the element arrays of the respective modules are oriented in parallel. Such a term "parallel" does not necessarily mean only parallel in a strict sense, but includes a range of errors normally allowed in the technical field to which the present invention belongs. The range of errors can mean, for example, a range less than strictly parallel±10°.

In each element array, the pair of servo signal reading elements and the plurality of magnetic head elements (that is, the recording element or the reproducing element) are usually arranged linearly to be spaced from each other. Here, the term "arranged linearly" means that each magnetic head element is arranged on a straight line connecting a central portion of one servo signal reading element and a central portion of the other servo signal reading element. The term "axis of the element array" in the present invention and the present specification means a straight line connecting a central portion of one servo signal reading element and a central portion of the other servo signal reading element.

Next, a configuration of a module and the like will be further described with reference to the drawings. Note that the form shown in the drawings is an example and does not limit the present invention.

Figure 5:
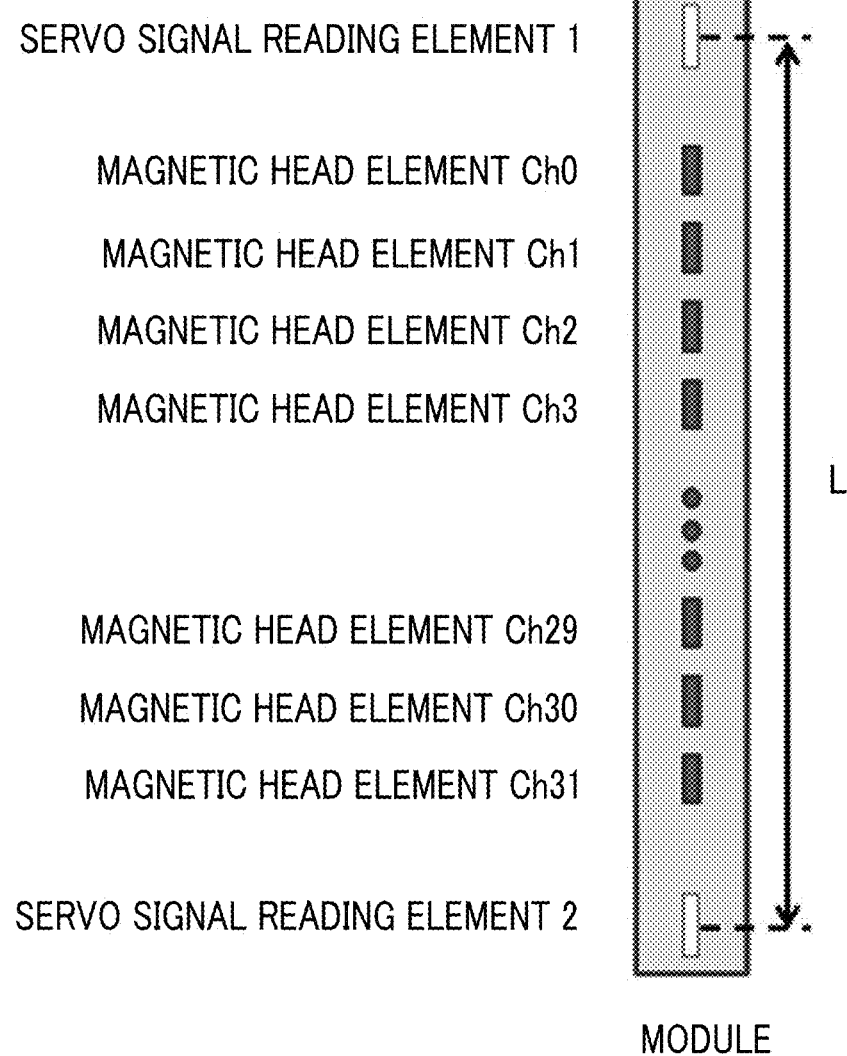
FIG. 5 is a schematic view showing an example of a module of a magnetic head.

FIG. 5 is a schematic view showing an example of the module of the magnetic head. The module shown in FIG. 5 has a plurality of magnetic head elements between a pair of servo signal reading elements (servo signal reading elements 1 and 2). The magnetic head element is also referred to as a "channel". "Ch" in the figure is an abbreviation for channel. The module shown in FIG. 5 has a total of 32 magnetic head elements from Ch0 to Ch31.

In FIG. 5, "L" represents a distance between a pair of servo signal reading elements, that is, a distance between one servo signal reading element and the other servo signal reading element. In the module shown in FIG. 5, "L" represents a distance between the servo signal reading element 1 and the servo signal reading element 2. Specifically, it is a distance between a central portion of the servo signal reading element 1 and a central portion of the servo signal reading element 2. Such a distance can be measured, for example, by an optical microscope or the like.

Figure 6:
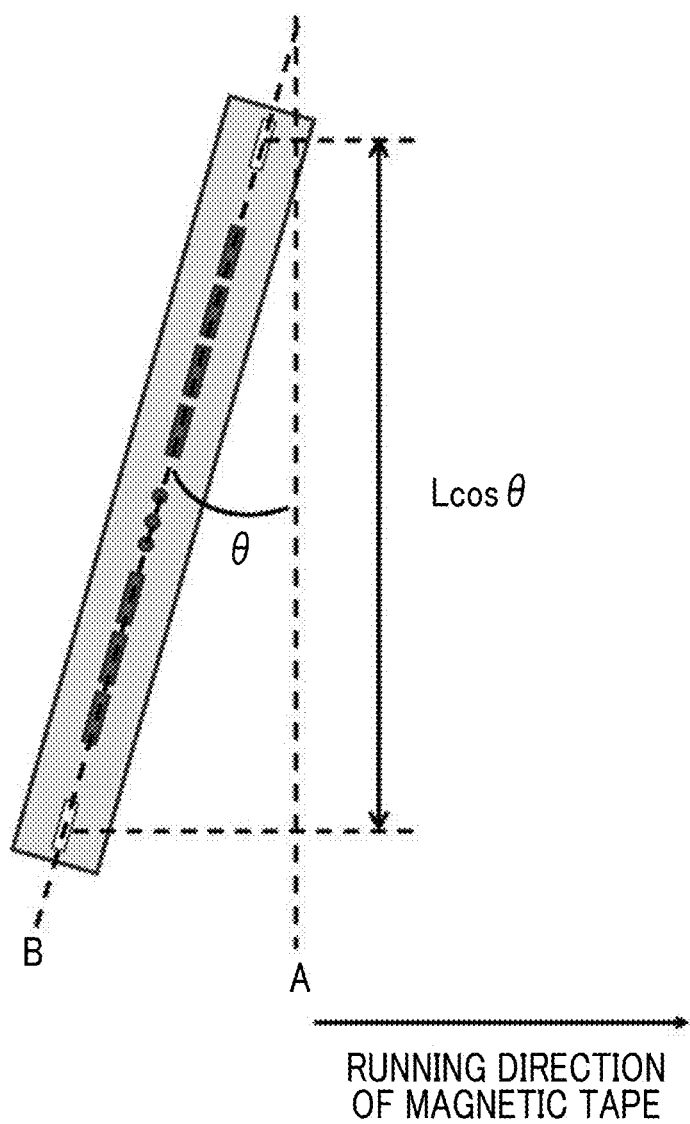
FIG. 6 is an explanatory diagram of a relative positional relationship between a module and a magnetic tape during magnetic tape running in a magnetic tape apparatus.

FIG. 6 is an explanatory diagram of a relative positional relationship between the module and the magnetic tape during running of the magnetic tape in the magnetic tape apparatus. In FIG. 6, the dotted line A indicates the width direction of the magnetic tape. The dotted line B indicates the axis of the element array. The angle $\theta$ can be said to be a head tilt angle during running of the magnetic tape, and is an angle formed by the dotted line A and the dotted line B. In a case where the angle $\theta$ is 0° during running of the magnetic tape, a distance in the magnetic tape width direction between one servo signal reading element and the other servo signal reading element in the element array (hereinafter, also referred to as "effective distance between servo signal reading elements") is "L". On the other hand, in a case where the angle $\theta$ exceeds 0°, the effective distance between the servo signal reading elements is "L cos $\theta$", where L cos $\theta$ is smaller than L. That is, "L cos $\theta$<L".

As described above, during recording or reproduction, in a case where the magnetic head for recording or reproducing data records or reproduces data while being deviated from a target track position due to the width deformation of the magnetic tape, a phenomenon such as overwriting of recorded data or reproduction failure may occur. For example, in a case where the width of the magnetic tape contracts or expands, a phenomenon may occur in which the magnetic head element, which should perform recording or reproduction at a target track position, performs recording or reproduction at a different track position. In addition, in a case where the width of the magnetic tape expands, a phenomenon may occur in which the effective distance between the servo signal reading elements becomes shorter than an interval between two servo bands adjacent to each other with the data band interposed therebetween (also referred to as "servo band interval" or "interval between servo bands", specifically, a distance between the two servo bands in the width direction of the magnetic tape), and data is not recorded or reproduced in a portion near an edge of the magnetic tape.

On the other hand, in a case where the element array is tilted at an angle $\theta$ exceeding 0°, the effective distance between the servo signal reading elements becomes "L cos $\theta$" as described above. The larger the value of $\theta$, the smaller the value of L cos $\theta$, and the smaller the value of $\theta$, the larger the value of L cos $\theta$. Therefore, by changing the value of $\theta$ according to a degree of the dimension change (that is, contraction or extension) in the width direction of the magnetic tape, it is possible to make the effective distance between the servo signal reading elements approximate to or match with the interval between the servo bands. As a result, it is possible to prevent a phenomenon such as overwriting of recorded data or reproduction failure due to the fact that the magnetic head for recording or reproducing data records or reproduces data while being deviated from a target track position due to the width deformation of the magnetic tape during recording or reproduction, or to reduce a frequency of the occurrence of the phenomenon.

Figure 7:
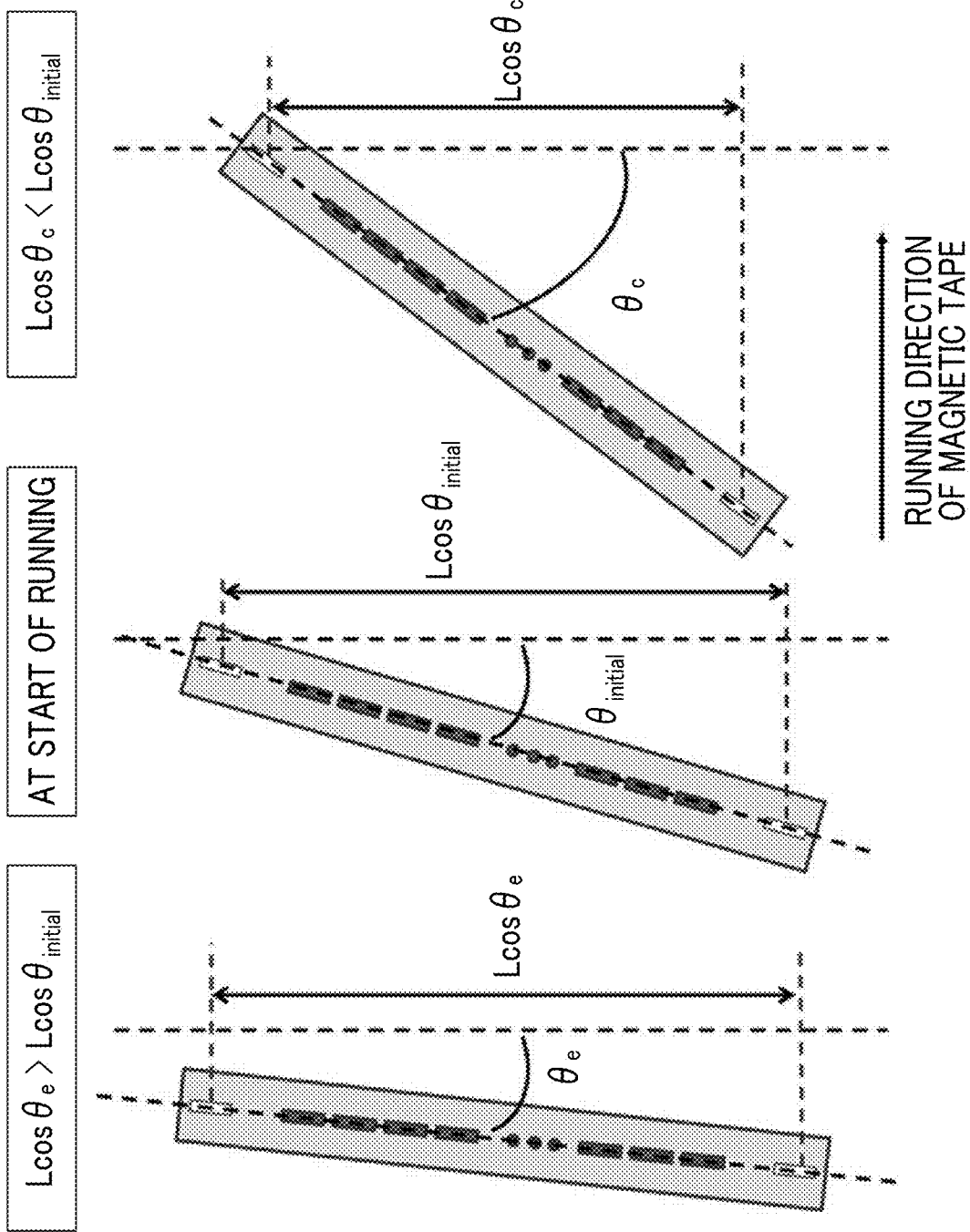
FIG. 7 is an explanatory diagram relating to a change in an angle θ during magnetic tape running.

FIG. 7 is an explanatory diagram relating to a change in the angle $\theta$ during running of the magnetic tape.

$\theta_{initial}$, which is an angle $\theta$ at the start of running, can be set to, for example, 0° or more or more than 0°.

In FIG. 7, the central figure shows a state of the module at the start of running.

In FIG. 7, the right figure shows a state of the module in a case where the angle $\theta$ is set to an angle $\theta_c$, which is an angle larger than $\theta_{initial}$. The effective distance between the servo signal reading elements L cos $\theta_c$ is a value smaller than L cos $\theta_{initial}$ at the start of running of the magnetic tape. In a case where the width of the magnetic tape contracts during running of the magnetic tape, it is preferable to perform such angle adjustment.

On the other hand, in FIG. 7, the left figure shows a state of the module in a case where the angle $\theta$ is set to an angle $\theta_e$, which is an angle smaller than $\theta_{initial}$. The effective distance between the servo signal reading elements L cos $\theta_e$ is a value larger than L cos $\theta_{initial}$ at the start of running of the magnetic tape. In a case where the width of the magnetic tape expands during running of the magnetic tape, it is preferable to perform such angle adjustment.

As described above, changing the head tilt angle during running of the magnetic tape can contribute to prevention of the phenomenon such as overwriting of recorded data or reproduction failure due to the fact that the magnetic head for recording or reproducing data records or reproduces data while being deviated from a target track position due to the width deformation of the magnetic tape during recording or reproduction, or can contribute to reduction of the frequency of the occurrence of the phenomenon.

Note that, for example, with the control means for the dynamic track position as described above, it is usually possible to compensate for off-track caused by the linear component of the tape width deformation, but it is difficult to suppress off-track caused by the non-linear component. On the other hand, in the magnetic tape, it is speculated that the VIVA 0.1 of the magnetic layer surface and the width direction σ of the VIVA 0.1 being in the above-described range contribute to the reduction of the non-linear component of the tape width deformation. It is considered that this makes it possible to improve the operational stability of the drive. Such a magnetic tape is preferable in order to further increase track density.

Hereinafter, the magnetic tape will be described in more detail.

Magnetic Layer
Ferromagnetic Powder

As a ferromagnetic powder included in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite crystal structure in an X-ray diffraction spectrum obtained by X-ray diffraction analysis, it is determined that the hexagonal ferrite crystal structure is detected as the main phase. In a case where only a single structure is detected by X-ray diffraction analysis, this detected structure is taken as the main phase. The hexagonal ferrite crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Note that a rare earth atom is not included in the above divalent metal atom. The term "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a prascodymium atom (Pr), a neodymium atom (Nd), a promethium atom (Pm), a samarium atom (Sm), a curopium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is one aspect of the hexagonal ferrite powder, will be described in more detail.

An activation volume of the hexagonal strontium ferrite powder is preferably in a range of 800 to 1600 $nm^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 $nm^3$ or more, and may be, for example, 850 $nm^3$ or more. Further, from the viewpoint of further improving the electromagnetic conversion characteristics, the activation volume of the hexagonal strontium ferrite powder is more preferably 1500 $nm^3$ or less, still more preferably 1400 $nm^3$ or less, still more preferably 1300 $nm^3$ or less, still more preferably 1200 $nm^3$ or less, and still more preferably 1100 $nm^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×$10^{-1}$ $J/m^3$.

$$Hc = 2Ku/Ms\{1 - [(kT/KuV)\ln(At/0.693)]^{1/2}\}$$

[In the above expression, Ku: anisotropy constant (unit: $J/m^3$), Ms: saturation magnetization (Unit: kA/m), k: Boltzmann constant, T: absolute temperature (unit: K), V: activation volume (unit: $cm^3$), A: spin precession frequency (unit: $s^{-1}$), t: magnetic field reversal time (unit: s)]

An index for reducing thermal fluctuation, in other words, for improving the thermal stability may include the anisotropy constant Ku. The hexagonal strontium ferrite powder preferably has Ku of 1.8×$10^5$ $J/m^3$ or more, and more preferably has Ku of 2.0×$10^5$ $J/m^3$ or more. Ku of the hexagonal strontium ferrite powder may be, for example, 2.5×$10^5$ $J/m^3$ or less. Here, since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder including a rare earth atom may have a rare earth atom surface layer portion uneven distribution property. The "rare earth atom surface layer portion uneven distribution property" of the present invention and the present specification means that a content of rare earth atom with respect to 100 at % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 at % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of a rare earth atom surface layer portion content/a rare earth atom bulk content>1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content>1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

Moreover, it is supposed that the use of the hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that the hexagonal strontium ferrite powder having a rare earth atom surface layer portion uneven distribution property can also contribute to an improvement of running durability of the magnetic tape. It is supposed that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in a case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Note that the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution thus obtained is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 A·m²/kg or more, and may be 47 A·m²/kg or more. On the other hand, from the viewpoint of noise reduction, σs is preferably 80 A·m²/kg or less and more preferably 60 A·m²/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [kOe] is $10^6/4\pi$ [A/m].

Regarding the content (bulk content) of a constituent atom of the hexagonal strontium ferrite powder, a strontium atom content may be, for example, in a range of 2.0 to 15.0 at % with respect to 100 at % of an iron atom. In one aspect, the hexagonal strontium ferrite powder may include only a strontium atom as a divalent metal atom. In another aspect, the hexagonal strontium ferrite powder may include one or more other divalent metal atoms in addition to a strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 at % with respect to 100 at % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M type hexagonal ferrite is represented by a composition formula of $AFe_{12}O_{19}$. Here, A represents a divalent metal atom, and in a case where the hexagonal strontium ferrite powder is the M type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

Metal Powder

Preferred specific examples of the ferromagnetic powder include a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an ε-iron oxide powder. In the present invention and the present specification, the term "ε-iron oxide powder" refers to a ferromagnetic powder in which an s-iron oxide crystal structure is detected as a main phase by X-ray diffraction analysis. For example, in a case where the highest intensity diffraction peak is attributed to an s-iron oxide crystal structure in an X-ray diffraction spectrum obtained by X-ray diffraction analysis, it is determined that the ε-iron oxide crystal structure is detected as the main phase. As a method of manufacturing an ε-iron oxide powder, a manufacturing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the method of manufacturing the ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic tape exhibiting excellent electromagnetic conversion characteristics. The activation volume of the ε-iron oxide powder is preferably 300 $nm^3$ or more, and may be, for example, 500 $nm^3$ or more. Further, from the viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, for improving the thermal stability may include the anisotropy constant Ku. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Here, since higher Ku means higher thermal stability, which is preferable, a value thereof is not limited to the values exemplified above.

From the viewpoint of increasing the reproduction output in a case of reproducing data recorded on the magnetic tape, it is desirable that mass magnetization σs of the ferromagnetic powder included in the magnetic tape is high. In this regard, in one aspect, σs of the ε-iron oxide powder may be 8 $A \cdot m^2/kg$ or more, and may be 12 $A \cdot m^2/kg$ or more. On the other hand, from the viewpoint of noise reduction, σs of the ε-iron oxide powder is preferably 40 $A \cdot m^2/kg$ or less and more preferably 35 $A \cdot m^2/kg$ or less.

In the present invention and the present specification, unless otherwise noted, an average particle size of various powders such as ferromagnetic powders is a value measured by the following method using a transmission electron microscope.

The powder is imaged at an imaging magnification of 100000× with a transmission electron microscope, the image is printed on photographic printing paper or displayed on a display so that the total magnification of 500000× to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size described in the section of Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Further, the aggregate of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of taking a sample powder from the magnetic tape in order to measure the particle size, a method disclosed in a paragraph 0015 of JP2011-048878A can be employed, for example.

In the present invention and the present specification, regarding the shape of the particle, the "plate shape" means a shape in which two plate surfaces face each other. The term "plate surface" refers to a plane observed on the surface of the particle of the particle image described above and a plane facing the plane. On the other hand, among the particle shapes that do not have such plate surfaces, the shape in which a long axis and a short axis are distinguished is the "elliptical shape". The long axis is determined as an axis (the straight line) along which the longest particle length can be taken. On the other hand, the short axis is determined as an axis along which the particle length is longest in a case where the particle length is taken along a straight line orthogonal to the long axis. A shape in which the long axis and the short axis are not distinguished, that is, a shape in which the long axis length is equal to the short axis length is the "spherical shape". A shape in which the long axis and the short axis cannot be specified from the shape is called an amorphous shape.

In the present invention and the present specification, unless otherwise noted, the size (particle size) of the particles constituting the powder is a plate diameter in a case where the shape of the particles observed in the particle image is plate-shaped, is a long axis length in a case where the shape is elliptical, is a diameter in a case where the shape is spherical, and is an equivalent circle diameter in a case where the shape is amorphous. The equivalent circle diameter is obtained by a circle projection method.

Regarding the plate-shaped particles, the "plate thickness" is the longest distance between two facing plate surfaces, and the average plate thickness is the arithmetic average of values obtained for the 500 particles.

The content (filling percentage) of the ferromagnetic powder of the magnetic layer is preferably in a range of 50 to 90 mass % and more preferably in a range of 60 to 90 mass %, with respect to the total mass of the magnetic layer. A high filling percentage of the ferromagnetic powder in the magnetic layer is preferable from the viewpoint of improving the recording density.

Binding Agent

The magnetic tape can be a coating type magnetic tape, and include a binding agent in the magnetic layer. The binding agent is one or more resins. As the binding agent, various resins usually used as a binding agent of a coating type magnetic tape can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the above binding agent, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the present invention and the present specification is a value obtained by performing polystyrene conversion of a value measured by gel permeation chromatography (GPC) under the following measurement conditions. The weight-average molecular weight of the binding agent shown in the section of Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: tetrahydrofuran (THF)

Curing Agent

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. The curing reaction proceeds in a magnetic layer forming step, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the composition for forming a magnetic layer in an amount of, for example, 0 to 80.0 parts by mass, and preferably 50.0 to 80.0 parts by mass from the viewpoint of improving a strength of the magnetic layer, with respect to 100.0 parts by mass of the binding agent.

Additive

The magnetic layer may include one or more kinds of additives, as necessary. As the additive, a commercially available product can be appropriately selected and used according to a desired property. Alternatively, a compound synthesized by a well-known method can be used as the additive. The additive can be used in any amount. Examples of the additive include the curing agent described above. In addition, examples of the additive which can be included in the magnetic layer include a non-magnetic powder, a lubricant, a dispersing agent, a dispersing assistant, an antibacterial agent, an antistatic agent, and an antioxidant. For example, for the lubricant, descriptions disclosed in paragraphs 0030 to 0033, 0035, and 0036 of JP2016-126817A can be referred to. The non-magnetic layer which will be described below may contain a lubricant. For the lubricant that can be contained in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. The dispersing agent may be added to a composition for forming a non-magnetic layer. For the dispersing agent that can be added to the composition for forming a non-magnetic layer, a description disclosed in a paragraph 0061 of JP2012-133837A can also be referred to.

Regarding the VIVA 0.1 of the magnetic layer surface and the width direction σ of the VIVA 0.1, as a result of the studies of the present inventor, it was clarified that it is preferable that the magnetic layer contains a non-magnetic powder composed of plate-shaped particles from the viewpoint of controlling the VIVA 0.1 of the magnetic layer surface and the width direction σ of the VIVA 0.1 within the range described above. Further, from the viewpoint of controlling the VIVA 0.1 of the magnetic layer surface and the width direction σ of the VIVA 0.1 within the range described above, it was also clarified from the studies of the present inventor that it is more preferable that the magnetic layer contains a non-magnetic powder having an average plate diameter of 50 nm or more and 1,000 nm or less and an average plate thickness of 12 nm or less. For example, the average plate thickness can be 3 nm or more, 4 nm or more, or 5 nm or more, and can also be less than the value exemplified here. The non-magnetic powder composed of a plate-shaped particle (preferably, a non-magnetic powder having an average plate diameter of 50 nm or more and 1,000 nm or less and an average plate thickness of 12 nm or less) can be, for example, a metal oxide powder. Specific examples of the metal oxide include aluminum oxide, zirconium oxide, and cerium oxide. Aluminum oxide is also called alumina, zirconium oxide is also called zirconia, and cerium oxide is also called ceria. For example, by heating an aqueous solution of a metal hydroxide at a liquid temperature of 200° C. or higher to proceed with a hydrothermal synthesis reaction, plate-shaped metal oxide particles can be obtained. By adjusting various conditions for the particle preparation (for example, the concentration of the aqueous solution, the mixing time in a case of preparing the aqueous solution, the heating temperature, and the heating time), the plate diameter and the plate thickness of the plate-shaped particles can be controlled. The content of the non-magnetic powder in the magnetic layer may be, for example, 0.02 to 0.80 parts by mass with respect to 100.0 parts by mass of the ferromagnetic powder.

Examples of the non-magnetic powder that can be contained in the magnetic layer include a non-magnetic powder that can function as an abrasive. For example, for the abrasive, descriptions disclosed in paragraphs 0030 to 0032 of JP2004-273070A can be referred to. As the abrasive, it is preferable to use an abrasive having a specific surface area (hereinafter, referred to as a "BET specific surface area") measured by a Brunauer-Emmett-Teller (BET) method of 14 $m^2/g$ or more. Further, from the viewpoint of the dispersibility, it is preferable to use an abrasive having a BET specific surface area of 40 $m^2/g$ or less.

As the abrasive, a non-magnetic powder having a Mohs hardness of more than 8 is preferable, and a non-magnetic powder having a Mohs hardness of 9 or more is more preferable. The maximum value of a Mohs hardness is 10. The abrasive can be a powder of an inorganic substance and can also be a powder of an organic substance. The abrasive can be an inorganic or organic oxide powder or a carbide powder. Examples of the carbide include boron carbide (for example, $B_4C$) and titanium carbide (for example, TiC). Diamond can also be used as the abrasive. In one aspect, the abrasive is preferably an inorganic oxide powder. Specifically, examples of the inorganic oxide include aluminum oxide (alumina), titanium oxide, cerium oxide (ceria), and zirconium oxide (zirconia), among these, alumina is preferable. A Mohs hardness of alumina is about 9. For the alumina powder that can be used as an abrasive, a description disclosed in a paragraph 0021 of JP2013-229090A can be referred to. The content of the abrasive in the magnetic layer is preferably 0.02 to 0.80 parts by mass with respect to 100.0 parts by mass of the ferromagnetic powder. As the abrasive, only one kind of the non-magnetic powder can be used, and two or more kinds of the non-magnetic powders having different compositions and/or physical properties (for example, size) can also be used. In a case where two or more kinds of the non-magnetic powders are used as the abrasive, the content of the abrasive means the total content of the two or more kinds of non-magnetic powders. The same applies to contents of various components in the present invention and the present specification. The abrasive is preferably subjected to a dispersion treatment separately from the ferromagnetic powder (separate dispersion), and more preferably subjected to a dispersion treatment separately from the non-magnetic powder described above (separate dispersion). In a case where the composition for forming a magnetic layer is prepared, two or more kinds of dispersion liquids having different components and/or dispersion conditions can be prepared as a dispersion liquid of the abrasive (hereinafter, also referred to as an "abrasive solution").

A dispersing agent can also be used for adjusting the dispersion state of the abrasive solution. Examples of a compound that can function as a dispersing agent for improving the dispersibility of the abrasive include an aromatic hydrocarbon compound having a phenolic hydroxy group. The term "phenolic hydroxy group" refers to a hydroxy group directly bonded to an aromatic ring. The aromatic ring included in the aromatic hydrocarbon compound may be a monocyclic ring, a polycyclic structure, or a fused ring. From the viewpoint of improving the dispersibility of the abrasive, an aromatic hydrocarbon compound including a benzene ring or a naphthalene ring is preferable. Further, the aromatic hydrocarbon compound may have a substituent other than the phenolic hydroxy group. Examples of the substituent other than the phenolic hydroxy group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxy groups included in one molecule of the aromatic hydrocarbon compound may be one, two, three, or more.

As a preferable aspect of the aromatic hydrocarbon compound having the phenolic hydroxy group, a compound represented by Formula 100 can be exemplified.

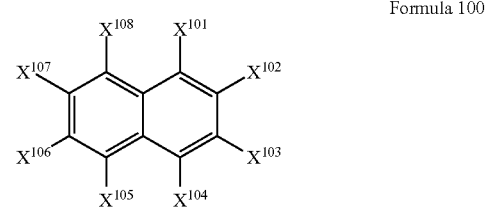

Formula 100

[In Formula 100, two of $X^{101}$ to $X^{108}$ are hydroxy groups, and the other six independently represent a hydrogen atom or a substituent.]

In the compound represented by Formula 100, the substitution positions of two hydroxy groups (phenolic hydroxy groups) are not particularly limited.

In the compound represented by Formula 100, two of $X^{101}$ to $X^{108}$ are hydroxy groups (phenolic hydroxy groups), and the other six independently represent a hydrogen atom or a substituent. Further, in $X^{101}$ to $X^{108}$, moieties other than the two hydroxy groups may all be hydrogen atoms, or some or all of them may be substituents. As a substituent, the substituent described above can be exemplified. As a substituent other than the two hydroxy groups, one or more phenolic hydroxy groups may be included. From the viewpoint of improving the dispersibility of the abrasive, it is preferable that the phenolic hydroxy group is not used except for the two hydroxy groups of $X^{101}$ to $X^{108}$. That is, the compound represented by Formula 100 is preferably dihydroxynaphthalene or a derivative thereof, and more preferably 2,3-dihydroxynaphthalene or a derivative thereof. Examples of preferred substituents represented by $X^{101}$ to $X^{108}$ include a halogen atom (for example, a chlorine atom or a bromine atom), an amino group, an alkyl group having 1 to 6 carbon atoms (preferably 1 to 4), a methoxy group and an ethoxy group, an acyl group, a nitro group and a nitroso group, and $—CH_2OH$ group.

For the dispersing agent for improving the dispersibility of the abrasive, descriptions disclosed in paragraphs 0024 to 0028 of JP2014-179149A can be referred to.

The dispersing agent for improving the dispersibility of the abrasive can be used, for example, in a proportion of 0.5 to 20.0 parts by mass, and is preferably used in a proportion of 1.0 to 10.0 parts by mass to 100.0 parts by mass of the abrasive, for example, in a case where the abrasive solution is prepared.

The magnetic layer described above can be provided on a surface of the non-magnetic support directly or indirectly through the non-magnetic layer.

Non-Magnetic Layer

Next, the non-magnetic layer will be described. The above magnetic tape may have a magnetic layer directly on the non-magnetic support, or may have a non-magnetic layer including a non-magnetic powder between the non-magnetic support and the magnetic layer. The non-magnetic powder used for the non-magnetic layer may be an inorganic substance powder (inorganic powder) or an organic substance powder (organic powder). In addition, the carbon black and the like can be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %, with respect to the total mass of the non-magnetic layer.

In one aspect, the non-magnetic layer can contain an Fe-based inorganic oxide powder as the non-magnetic powder. In the present invention and the present specification, the term "Fe-based inorganic oxide powder" refers to an inorganic oxide powder containing iron as a constituent element. Specific examples of the Fe-based inorganic oxide powder include an α-iron oxide powder and a goethite powder. In the present invention and the present specification, the term "α-iron oxide powder" refers to a non-magnetic powder in which an α-iron oxide crystal structure is detected as a main phase by X-ray diffraction analysis. The α-iron oxide powder is also generally called hematite or the like.

From the viewpoint of controlling the width direction σ of the VIVA 0.1 within the range described above, it was clarified from the studies of the present inventor that it is preferable that an Fe-based inorganic oxide powder having an average particle volume of $2.0 \times 10^6$ μm$^3$ or less is used as the non-magnetic powder of the non-magnetic layer. Therefore, the average particle volume of the Fe-based inorganic oxide powder included in the non-magnetic layer is preferably $2.0 \times 10^{-6}$ μm$^3$ or less, more preferably $1.5 \times 10^{-6}$ μm$^3$ or less, and still more preferably $1.0 \times 10^6$ μm$^3$ or less. The average particle volume may be, for example, $1.0 \times 10^{-9}$ μm$^3$ or more or $1.0 \times 10^{-8}$ μm$^3$ or more, or may be smaller than the values exemplified here.

In the present invention and the present specification, the average particle volume is a value obtained by the following method.

In order to observe the Fe-based inorganic oxide powder included in the non-magnetic layer of the magnetic tape, first, as a sample pretreatment, slicing is performed by a microtome method. The slicing is performed such that a slicing sample capable of observing a cross section in a thickness direction of the magnetic tape along the longitudinal direction of the magnetic tape can be obtained. For each of Examples and Comparative Examples described later, a slicing sample was obtained using Leica EM UC6 manufactured by Leica Biosystems Nussloch GmbH as a microtome from one of the manufactured magnetic tapes.

A cross section of the obtained slicing sample is observed using a transmission electron microscope (TEM) at an acceleration voltage of 300 kV and a total magnification of 200,000× such that a range from the non-magnetic support to the magnetic layer is included. Thereby, a cross-sectional TEM image is obtained. As the transmission electron microscope, for example, JEM-2100Plus manufactured by JEOL Ltd. can be used. In Examples and Comparative Examples described below, JEM-2100Plus manufactured by JEOL Ltd. was used as a transmission electron microscope.

In the obtained cross-sectional TEM image, 50 particles of the Fe-based inorganic oxide powder are specified with respect to the particles contained in the non-magnetic layer by using a microelectron beam diffraction method. The electron beam diffraction in the microelectron beam diffraction method is performed using a transmission electron microscope at an acceleration voltage of 200 kV and a camera length of 50 cm. In Examples and Comparative Examples described below, in order to perform the electron beam diffraction in the microelectron beam diffraction method, JEM-2100Plus manufactured by JEOL Ltd. was used as a transmission electron microscope.

After that, using 50 particles of the Fe-based inorganic oxide powder specified as described above, the average particle volume is obtained as follows.

First, a long axis length (hereinafter, also referred to as "DL") and a short axis length (hereinafter, also referred to as "DS") of each particle are measured.

The long axis length DL means the maximum of distances between two parallel lines drawn from all angles so as to be in contact with the contour of the particle (so-called maximum Feret's diameter).

In a case where a direction of the long axis length defined as described above is called a long axis direction, the short axis length DS means the maximum of lengths of the particles in a direction orthogonal to the long axis direction of the particles.

Next, an average long axis length DLave is obtained as an arithmetic average of the long axis lengths DL of the 50 measured particles. ave is an abbreviation for average.

In addition, an average short axis length DSave is obtained as an arithmetic average of the short axis lengths DS of the 50 measured particles.

From the average long axis length DLave and the average short axis length DSave, an average particle volume Vave is obtained by the following formula.

$$Vave = \pi/6 \times DSave^2 \times DLave$$

In addition, in one aspect, the non-magnetic layer can contain carbon black as the non-magnetic powder. An average particle size of the carbon black can be, for example, 10 nm or more and 50 nm or less. From the viewpoint of controlling the width direction σ of the VIVA 0.1 within the range described above, it was clarified from the studies of the present inventor that it is preferable that carbon black having a pH of 9.0 or less is used as the non-magnetic powder of the non-magnetic layer. Therefore, the pH of the carbon black contained in the non-magnetic layer is preferably 9.0 or less, more preferably 8.5 or less, still more preferably 8.0 or less, and still more preferably 7.5 or less. The pH may be, for example, 1.0 or more, 2.0 or more, 3.0 or more, 4.0 or more, 5.0 or more, or 6.0 or more, or may be smaller than the values exemplified here.

In the present invention and the present specification, the pH of the carbon black is a value measured according to a standard test method ASTM D1512.

The non-magnetic layer preferably contains at least one of an Fe-based inorganic oxide powder having an average particle volume of $2.0 \times 10^6$ µm$^3$ or less or carbon black having a pH of 9.0 or less, and more preferably contains both. A content of an Fe-based inorganic oxide powder having an average particle volume of $2.0 \times 10^{-6}$ µm$^3$ or less with respect to 100.0 parts by mass of the total amount of the non-magnetic powder contained in the non-magnetic layer may be 50.0 parts by mass or more, 60.0 parts by mass or more, or 70.0 parts by mass or more, and for example, 90.0 parts by mass or less. A content of carbon black having a pH of 9.0 or less with respect to 100.0 parts by mass of the total amount of the non-magnetic powder contained in the non-magnetic layer may be 10.0 parts by mass or more or 20.0 parts by mass or more, and for example, 50.0 parts by mass or less, 40.0 parts by mass or less, or 30.0 parts by mass or less.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and coercivity.

Non-Magnetic Support

Next, the non-magnetic support will be described. Examples of the non-magnetic support (hereinafter, also simply referred to as a "support") include well-known components such as polyethylene terephthalate, polyethylene naphthalate, polyamide, polyamideimide, and aromatic polyamide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

In the one embodiment, the non-magnetic support of the magnetic tape can be an aromatic polyester support. In the invention and the specification, "aromatic polyester" means a resin including an aromatic skeleton and a plurality of ester bonds, and the "aromatic polyester support" means a support including at least one layer of an aromatic polyester film. The "aromatic polyester film" is a film in which the largest component in the component configuring this film based on mass is aromatic polyester. The "aromatic polyester support" of the invention and the specification include a support in which all of resin films included in this support is the aromatic polyester film and a support including the aromatic polyester film and the other resin film. Specific embodiments of the aromatic polyester support include a single aromatic polyester film, a laminated film of two or more layers of the aromatic polyester film having the same constituting component, a laminated film of two or more layers of the aromatic polyester film having different constituting components, and a laminated film including one or more layers of the aromatic polyester film and one or more layers of resin film other than the aromatic polyester. In the laminated film, an adhesive layer or the like may be randomly included between two adjacent layers. In addition, the aromatic polyester support may randomly include a metal film and/or a metal oxide film formed by performing vapor deposition or the like on one or both surfaces. The same applies to a "polyethylene terephthalate support" and a "polyethylene naphthalate support" in the invention and the specification.

An aromatic ring included in an aromatic skeleton including the aromatic polyester is not particularly limited. Specific examples of the aromatic ring include a benzene ring and a naphthalene ring.

For example, polyethylene terephthalate (PET) is polyester including a benzene ring, and is a resin obtained by polycondensation of ethylene glycol and terephthalic acid and/or dimethyl terephthalate. The "polyethylene terephthalate" of the invention and the specification includes polyethylene terephthalate having a structure including one or more kinds of other components (for example, copolymerization component, and component introduced to a terminal or a side chain), in addition to the component described above.

Polyethylene naphthalate (PEN) is polyester including a naphthalene ring, and is a resin obtained by performing esterification reaction of dimethyl 2,6-naphthalene dicarboxylate and ethylene glycol, and then, transesterification and polycondensation reaction. The "polyethylene naphthalate" of the invention and the specification includes polyethylene naphthalate having a structure including one or more kinds of other components (for example, copolymerization component, and component introduced to a terminal or a side chain), in addition to the component described above.

In addition, in the one embodiment, the non-magnetic support of the magnetic tape can be an aromatic polyamide support. In the invention and the specification, the "aromatic polyamide" means a resin containing an aromatic skeleton and a plurality of amide bonds. An aromatic ring included in an aromatic skeleton including the aromatic polyamide is not particularly limited. Specific examples of the aromatic ring include a benzene ring and the like. The "aromatic polyamide support" means a support including at least one layer of an aromatic polyamide film. The "aromatic polyamide film" refers to a film in which the largest component in the component configuring this film based on mass is aromatic polyamide. The "aromatic polyamide support" of the invention and the specification include a support in which all of resin films included in this support is the aromatic polyamide film and a support including the aromatic polyamide film and the other resin film. Specific embodiments of the aromatic polyamide support include a single aromatic polyamide film, a laminated film of two or more layers of the aromatic polyamide film having the same constituting component, a laminated film of two or more layers of the aromatic polyamide film having different constituting components, and a laminated film including one or more layers of the aromatic polyamide film and one or more layers of resin film other than the aromatic polyamide.

In the laminated film, an adhesive layer or the like may be randomly included between two adjacent layers. In addition, the aromatic polyamide support may randomly include a metal film and/or a metal oxide film formed by performing vapor deposition or the like on one or both surfaces.

In addition, as described above, the non-magnetic support can be a biaxial stretching film, and may be a film subjected to a corona discharge, a plasma treatment, an easy-bonding, a heat treatment, or the like.

As an indicator of physical properties of the non-magnetic support, for example, a moisture content can be used. In the invention and the specification, the moisture content of the non-magnetic support is a value obtained by the following method. The moisture content shown in the table which will be described later is a value obtained by the following method.

A test piece (for example, a test piece having a mass of several grams) cut out from the non-magnetic support, moisture content of which is to be measured, is dried in a vacuum dryer at a temperature of 180° C. and under a pressure of 100 Pa (pascal) or less until a constant weight is obtained. The mass of the dried test piece is defined as W1. W1 is a value measured in a measurement environment of a temperature of 23° C. and relative humidity of 50% within 30 seconds after being taken out of the vacuum dryer. Next, the mass of this test piece after being placed in an environment of a temperature of 25° C. and relative humidity of 75% for 48 hours is defined as W2. W2 is a value measured in a measurement environment of a temperature of 23° C. and relative humidity of 50% within 30 seconds after being taken out of the environment. The moisture content is calculated by the following equation.

$$\text{Moisture content (\%)} = [(W2 - W1)/W1] \times 100$$

For example, it is also possible to obtain the moisture content of the non-magnetic support obtained by the method described above, after removing portions other than the non-magnetic support such as the magnetic layer from the magnetic tape by a well-known method (for example, film removal using an organic solvent).

In one embodiment, the moisture content of the non-magnetic support of the magnetic tape is preferably 2.0% or less, more preferably 1.8% or less, even more preferably 1.6% or less, further preferably 1.4% or less, even further preferably 1.2% or less, and still preferably 1.0% or less. In addition, the moisture content of the non-magnetic support of the magnetic tape can be 0%, 0% or more, more than 0%, or 0.1% or more.

As an indicator of physical properties of the non-magnetic support, a Young's modulus can also be used. The Young's modulus of the non-magnetic support in the present invention and the present specification is a value measured by the following method in a measurement environment of a temperature of 23° C. and a relative humidity of 50%.

A test piece cut out from the non-magnetic support to be measured is pulled by a universal tensile testing device under the conditions of a chuck-to-chuck distance of 100 mm, a tensile rate of 10 mm/min, and a chart rate of 500 mm/min. As the universal tensile testing device, for example, a commercially available universal tensile testing device such as TENSILON manufactured by Baldwin Corporation or a universal tensile testing device having a well-known configuration can be used. The Young's moduli of the test piece in the longitudinal direction and the width direction are respectively calculated from a tangent line of a rising portion of a load-elongation curve obtained as described above. Here, the longitudinal direction and the width direction of the test piece mean a longitudinal direction and a width direction in a case where this test piece is included in the magnetic tape.

For example, it is also possible to obtain the Young's moduli of the non-magnetic support in the longitudinal direction and the width direction obtained by the method described above, after removing portions other than the non-magnetic support such as the magnetic layer from the magnetic tape by a well-known method (for example, film removal using an organic solvent).

In one embodiment, the Young's modulus in the longitudinal direction of the non-magnetic support of the magnetic tape is preferably 3,000 MPa or more, more preferably 4,000 MPa or more, even more preferably 5,000 MPa or more, and further preferably 6,000 MPa or more. In addition, the Young's modulus of the non-magnetic support of the magnetic tape in the longitudinal direction can be 15,000 MPa or less, 13,000 MPa or less, or 12,000 MPa or less. In the width direction, the Young's modulus in the width direction of the non-magnetic support of the magnetic tape is preferably 2,000 MPa or more, more preferably 3,000 MPa or more, even more preferably 4,000 MPa or more, and further preferably 5,000 MPa or more. In addition, the Young's modulus of the non-magnetic support of the magnetic tape in the width direction can be 12,000 MPa or less, 11,000 MPa or less, or 10,000 MPa or less. During manufacturing the magnetic tape, for the non-magnetic support, usually, a machine direction (MD direction) of a film is used as the longitudinal direction and a transverse direction (TD direction) is used as the width direction. In addition, in one embodiment, the Young's modulus in the longitudinal direction is preferably greater than the Young's modulus in the width direction, and a difference (Young's modulus in the longitudinal direction-Young's modulus in the width direction) is more preferably in the range of 800 to 3,000 MPa.

The moisture content and the Young's modulus of the non-magnetic support can be controlled by a type and a mixing ratio of the components constituting the support, manufacturing conditions of the support, and the like. For example, in a biaxial stretching process, the Young's modulus in the longitudinal direction and the Young's modulus in the width direction can be controlled respectively by adjusting the stretching ratio in each direction.

Back Coating Layer

The tape may or may not have a back coating layer including a non-magnetic powder on a surface side of the non-magnetic support opposite to a surface side having the magnetic layer. The back coating layer preferably contains one or both of carbon black and an inorganic powder. The back coating layer can include a binding agent, and can also include an additive. For details of the non-magnetic powder, the binding agent, and the additive of the back coating layer, a well-known technology regarding the back coating layer can be applied, and a well-known technology regarding the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding a thickness (total thickness) of the magnetic tape, it has been required to increase the recording capacity (increase the capacity) of the magnetic recording medium with the enormous increase in the amount of information in recent years. As means for increasing the capacity of a tape-shaped magnetic recording medium (that is, a magnetic tape), a thickness of the magnetic tape may be reduced to increase a length of the magnetic tape accommodated in one roll of a magnetic tape cartridge. From this point, the thickness (total thickness) of the magnetic tape is preferably 5.6 µm or less, more preferably 5.5 µm or less, still more preferably 5.4 µm or less, still more preferably 5.3 µm or less, still more preferably 5.2 µm or less, still more preferably 5.0 µm or less, and still more preferably 4.8 µm or less. In addition, from the viewpoint of ease of handling, the thickness of the magnetic tape is preferably 3.0 µm or more, more preferably 3.5 µm or more, and still more preferably 4.0 µm or more.

The thickness (total thickness) of the magnetic tape can be measured by the following method.

Ten samples (for example, 5 to 10 cm in length) are cut out from any part of the magnetic tape, and these samples are stacked to measure the thickness. A value (thickness per sample) obtained by dividing the measured thickness by 1/10 is set as the total thickness. The thickness measurement can be performed using a well-known measuring instrument capable of measuring a thickness on the order of 0.1 µm.

A thickness of the non-magnetic support is preferably 2.0 to 5.0 µm, and more preferably 3.0 to 5.0 µm.

A thickness of the magnetic layer can be optimized according to a saturation magnetization amount of a magnetic head used, a head gap length, a band of a recording signal, and the like, and is generally 0.01 µm to 0.15 µm, and, from the viewpoint of high-density recording, the thickness is preferably 0.02 µm to 0.12 µm and more preferably 0.03 µm to 0.1 µm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 µm, preferably 0.1 to 1.0 µm, and more preferably 0.1 to 0.7 µm.

A thickness of the back coating layer is preferably 0.9 µm or less and more preferably 0.1 to 0.7 µm.

Various thicknesses such as the thickness of the magnetic layer and the like can be obtained by the following method.

A cross section of the magnetic tape in a thickness direction is exposed by an ion beam, and then the exposed cross section observation is performed using a scanning electron microscope or a transmission electron microscope. Various thicknesses can be obtained as an arithmetic average of thicknesses obtained at two optional points in the cross section observation. Alternatively, the various thicknesses can be obtained as a designed thickness calculated according to manufacturing conditions.

Manufacturing Step
Preparation of Composition for Forming Each Layer

A composition for forming the magnetic layer, the non-magnetic layer, or the back coating layer usually includes a solvent together with the various components described above. As a solvent, one kind or two or more kinds of various solvents usually used for manufacturing a coating type magnetic recording medium can be used. A solvent content of a composition for forming each layer is not particularly limited. For the solvent, a description disclosed in a paragraph 0153 of JP2011-216149A can be referred to. The concentration of solid contents and the solvent composition of the composition for forming each layer need only be appropriately adjusted in accordance with the handling suitability of the composition, the coating conditions, and the thickness of each layer to be formed. A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Various components used in the preparation of the composition for forming each layer may be added at the beginning or during any step. In addition, each component may be separately added in two or more steps. For example, a binding agent may be added separately in a kneading step, a dispersing step, and a mixing step for adjusting a viscosity after dispersion. In the manufacturing step of the magnetic tape, a well-known manufacturing technology in the related art can be used in a part of the steps. In the kneading step, an open kneader, a continuous kneader, a pressure kneader, or a kneader having a strong kneading force such as an extruder can be used. Details of the kneading step are disclosed in JP1989-106338A (JP-H1-106338A) and JP1989-79274A (JP-H1-79274A). As a disperser, various well-known dispersers using a shearing force, such as a beads mill, a ball mill, a sand mill, or a homomixer, can be used. Dispersion beads can be preferably used for the dispersion. Examples of the dispersion beads include ceramic beads and glass beads, and zirconia beads are preferable. Two or more kinds of beads may be used in combination. A bead diameter (particle size) and a bead filling rate of the dispersion beads are not particularly limited and need only be set depending on a powder to be dispersed. The dispersion time is not particularly limited. From the viewpoint of controlling the VIVA 0.1 of the magnetic layer surface and the width direction σ of the VIVA 0.1 within the range described above, the present inventor supposes that it is preferable to increase the dispersion time in the preparation of the composition for forming a magnetic layer. The composition for forming each layer may be filtered by a well-known method before performing the coating step. The filtering can be performed by using a filter, for example. As the filter used in the filtering, a filter having a pore diameter of 0.01 to 3 µm (for example, a filter made of glass fiber or a filter made of polypropylene) can be used, for example.

Coating Step, Cooling Step, and Heating and Drying Step

The magnetic layer can be formed by directly applying the composition for forming a magnetic layer onto the non-magnetic support or performing multilayer applying of the composition for forming a magnetic layer with the composition for forming a non-magnetic layer sequentially or simultaneously. For details of the coating for forming each layer, a description disclosed in a paragraph 0066 of JP2010-231843A can be referred to.

As described above, in one aspect, the magnetic tape may have the non-magnetic layer between the non-magnetic support and the magnetic layer. Such a magnetic tape can be preferably manufactured by sequential multilayer coating. A manufacturing step of performing the sequential multilayer coating can be preferably performed as follows. The non-magnetic layer is formed through a coating step of applying a composition for forming a non-magnetic layer onto a non-magnetic support to form a coating layer, and a heating and drying step of drying the formed coating layer by a heat treatment. Then, the magnetic layer is formed through a coating step of applying a composition for forming a magnetic layer onto the formed non-magnetic layer to form a coating layer, and a heating and drying step of drying the formed coating layer by a heat treatment. In one aspect, it is also possible to form a coating layer by performing the coating step using the composition for forming a non-magnetic layer, and to perform the cooling step of cooling the coating layer between the coating step and the heating and drying step in a non-magnetic layer forming step of the manufacturing method in which the sequential multilayer coating is performed.

Hereinafter, an example of the manufacturing step of the magnetic tape will be described with reference to FIG. 8. Note that the present invention is not limited to the following examples.

Figure 8:
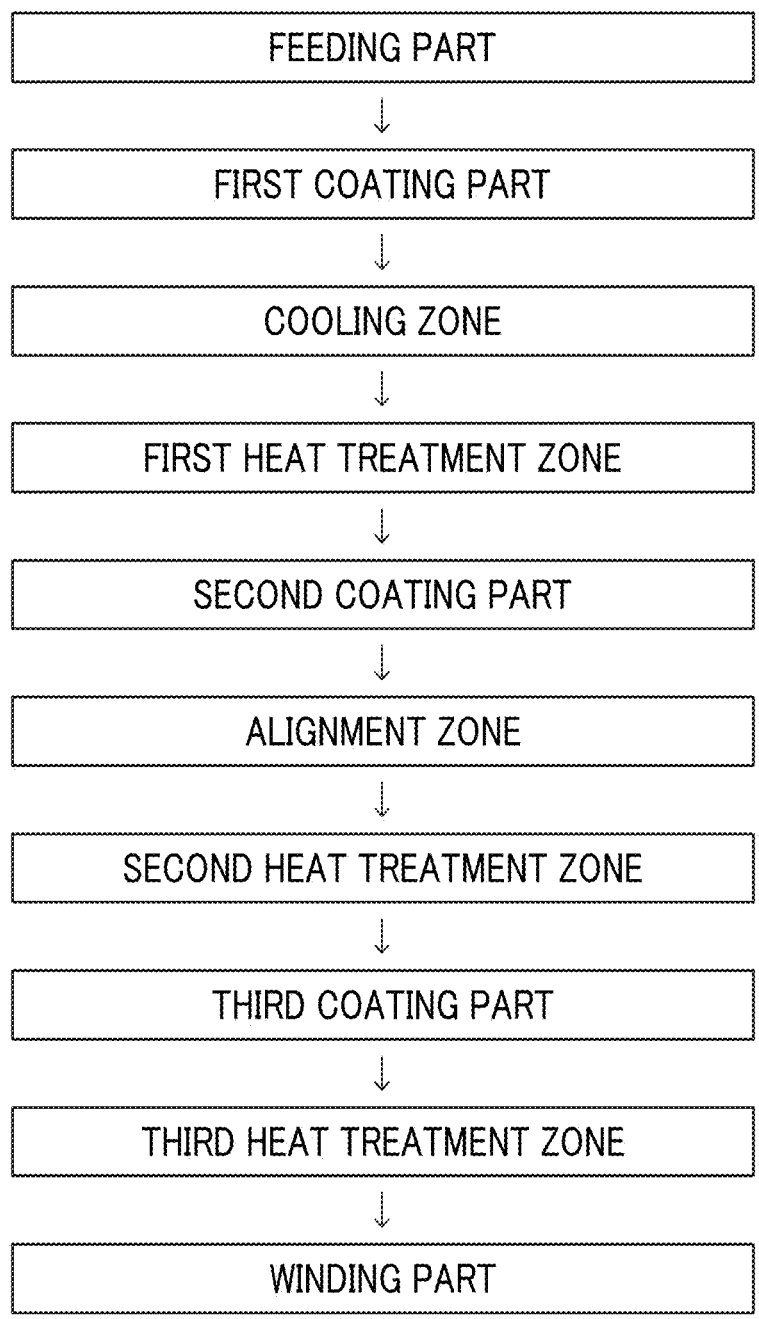
FIG. 8 shows an example (schematic process diagram) of a manufacturing step of the magnetic tape.

FIG. 8 is a schematic step diagram showing an example of a step of manufacturing a magnetic tape including a non-magnetic layer and a magnetic layer in this order on one surface of a non-magnetic support and a back coating layer on the other surface thereof. In the example shown in FIG. 8, an operation of feeding a non-magnetic support (elongated film) from a feeding part and winding the non-magnetic support around a winding part is continuously performed, and various treatments of coating, drying, and alignment are performed in each part or each zone shown in FIG. 8, and thus, it is possible to form a non-magnetic layer and a magnetic layer on one surface of the running non-magnetic support by sequential multilayer coating and to form a back coating layer on the other surface thereof. The example shown in FIG. 8 can be the same as the manufacturing step normally performed for manufacturing a coating type magnetic recording medium, except for including a cooling zone.

The composition for forming a non-magnetic layer is applied onto the non-magnetic support fed from the feeding part in a first coating part (coating step of composition for forming a non-magnetic layer).

After the coating step, a coating layer of the composition for forming a non-magnetic layer formed in the coating step is cooled in a cooling zone (cooling step). For example, the cooling step can be performed by allowing the non-magnetic support on which the coating layer is formed to pass through a cooling atmosphere. An atmosphere temperature of the cooling atmosphere may be preferably in a range of −10° C. to 0° C., and more preferably in a range of −5° C. to 0° C. The time for performing the cooling step (for example, time while any part of the coating layer is delivered to and sent from the cooling zone (hereinafter, also referred to as a "staying time")) is not particularly limited. In the cooling step, cooled air may blow to the surface of the coating layer.

After the cooling zone, in a first heat treatment zone, the coating layer is heated after the cooling step to dry the coating layer (heating and drying step). The heating and drying treatment can be performed by allowing the non-magnetic support including the coating layer after the cooling step to pass through a heating atmosphere. An atmosphere temperature of the heating atmosphere here, and an atmosphere temperature of the heating atmosphere in the heating and drying step in a second heat treatment zone and the heating and drying step in a third heat treatment zone, which will be described below, are also referred to as a "drying temperature". In one aspect, the drying temperature in each heat treatment zone is preferably 95° C. or higher, and more preferably 100° C. or higher. In addition, the drying temperature in each heat treatment zone may be, for example, 140° C. or lower or 130° C. or lower, and may be higher than the temperature described here. In addition, heated air may optionally blow to the surface of the coating layer.

Next, in a second coating part, the composition for forming a magnetic layer is applied onto the non-magnetic layer formed by performing the heating and drying step in the first heat treatment zone (coating step of composition for forming a magnetic layer).

After that, in an aspect of performing an alignment treatment, while the coating layer of the composition for forming a magnetic layer is in a wet state, an alignment treatment of the ferromagnetic powder in the coating layer is performed in an alignment zone. For the alignment treatment, various well-known technologies including a description disclosed in a paragraph 0067 of JP2010-231843A can be used. For example, a vertical alignment treatment can be performed by a well-known method such as a method using a polar opposing magnet. In the alignment zone, a drying speed of the coating layer can be controlled depending on a temperature of dry air and an air volume and/or a transportation speed of the magnetic tape in the alignment zone. Further, the coating layer may be preliminarily dried before the transportation to the alignment zone.

The coating layer after the alignment treatment is subjected to the heating and drying step in the second heat treatment zone.

Next, in a third coating part, a composition for forming a back coating layer is applied onto a surface of the non-magnetic support opposite to the surface on which the non-magnetic layer and the magnetic layer are formed, to form a coating layer (coating step of composition for forming a back coating layer). After that, in the third heat treatment zone, the coating layer is heated and dried.

By the above step, it is possible to obtain the magnetic tape including the non-magnetic layer and the magnetic layer in this order on one surface of the non-magnetic support and the back coating layer on the other surface thereof.

Other Steps

In the manufacturing step of the magnetic tape, a calendering treatment is usually performed in order to improve the surface smoothness of the magnetic tape. Strengthening the calendering treatment conditions can contribute to reduction of the value of the width direction σ of the VIVA 0.1. Specific examples of strengthening the calendering treatment conditions include increasing a calender pressure, increasing a calender temperature, and decreasing a calender speed. Regarding the calendering treatment conditions, the calender pressure (linear pressure) is preferably 300 to 500 kN/m, and more preferably 310 to 350 kN/m, the calender temperature (surface temperature of a calender roll) is preferably 95° C. to 120° C., and more preferably 100° C. to 120° C., and the calender speed is preferably 50 to 75 m/min.

For other various steps for manufacturing the magnetic tape, descriptions disclosed in paragraphs 0067 to 0070 of JP2010-231843A can be referred to.

Through various steps, a long magnetic tape original roll can be obtained. The obtained magnetic tape original roll is cut (slit) by a well-known cutter, for example, to have a width of the magnetic tape to be accommodated in the magnetic tape cartridge. The width can be determined according to the standard, and is usually ½ inches. 1 inch=2.54 cm.

A servo pattern is usually formed on the magnetic tape obtained by slitting.

Formation of Servo Pattern

The term "formation of servo pattern" can also be referred to as "recording of servo signal". The formation of the servo pattern will be described below.

The servo pattern is usually formed along a longitudinal direction of the magnetic tape. Examples of control (servo control) systems using a servo signal include a timing-based servo (TBS), an amplitude servo, and a frequency servo.

As shown in a European computer manufacturers association (ECMA)-319 (June 2001), a magnetic tape conforming to a linear tape-open (LTO) standard (generally called "LTO tape") employs a timing-based servo system. In this timing-based servo system, the servo pattern is formed by continuously arranging a plurality of pairs of non-parallel magnetic stripes (also referred to as "servo stripes") in the longitudinal direction of the magnetic tape. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

In a method of uniquely specifying the servo band, a staggered method as shown in ECMA-319 (June 2001) is used. In this staggered method, a group of pairs of non-parallel magnetic stripes (servo stripes) arranged continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two additional methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

Vertical Squareness Ratio

In one aspect, the vertical squareness ratio of the magnetic tape, may be, for example, 0.55 or more, and from the viewpoint of improving the electromagnetic conversion characteristics, the vertical squareness ratio is preferably 0.60 or more, and more preferably 0.65 or more. In principle, the upper limit of the squareness ratio is 1.00 or less. The vertical squareness ratio of the magnetic tape may be 1.00 or less, 0.95 or less, 0.90 or less, 0.85 or less, or 0.80 or less. From the viewpoint of improving the electromagnetic conversion characteristics, a large value of the vertical squareness ratio of the magnetic tape is preferable. The vertical squareness ratio of the magnetic tape can be controlled by a well-known method such as performing a vertical alignment treatment.

In the present invention and the present specification, the term "vertical squareness ratio" refers to a squareness ratio measured in the vertical direction of the magnetic tape. The term "vertical direction" described regarding the squareness ratio refers to a direction orthogonal to the magnetic layer surface, and can also be referred to as a thickness direction. In the present invention and the present specification, the vertical squareness ratio is obtained by the following method.

A sample piece having a size capable of being introduced into a vibrating sample magnetometer is cut out from the magnetic tape to be measured. For this sample piece, using a vibrating sample magnetometer, a magnetic field is applied in the vertical direction (direction orthogonal to the magnetic layer surface) of the sample piece at a maximum applied magnetic field of 3979 kA/m, a measurement temperature of 296 K, and a magnetic field sweeping speed of 8.3 kA/m/sec, and the magnetization strength of the sample piece with respect to the applied magnetic field is measured. The measured value of the magnetization strength is obtained as a value after demagnetic field correction and as a value obtained by subtracting the magnetization of a sample probe of the vibrating sample magnetometer as a background noise. Assuming that the magnetization strength at the maximum applied magnetic field is Ms and the magnetization strength at zero applied magnetic field is Mr, a squareness ratio SQ is a value calculated as SQ=Mr/Ms. The measurement temperature refers to a temperature of the sample piece, and, by setting an atmosphere temperature around the sample piece to a measurement temperature, the temperature of the sample piece can be set to a measurement temperature by establishing a temperature equilibrium.

Magnetic Tape Cartridge

Another aspect of the present invention relates to a magnetic tape cartridge comprising the magnetic tape described above.

The details of the magnetic tape included in the above magnetic tape cartridge are as described above. The magnetic tape cartridge can be mounted on the magnetic tape apparatus comprising the magnetic head and used for recording and/or reproducing data.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic tape apparatus side. For example, during this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

In one aspect, the magnetic tape cartridge may include a cartridge memory. The cartridge memory can be, for example, a non-volatile memory, and, in one aspect, head tilt angle adjustment information is already recorded or the head tilt angle adjustment information is recorded. The head tilt angle adjustment information is information for adjusting the head tilt angle during running of the magnetic tape in the magnetic tape apparatus. For example, as the head tilt angle adjustment information, the value of the servo band interval at each position in the longitudinal direction of the magnetic tape during data recording can be recorded. For example, in a case of reproducing the data recorded on the magnetic tape, the value of the servo band interval can be measured during reproduction, and the head tilt angle can be changed by a control device of the magnetic tape apparatus such that the absolute value of the difference from the servo band interval during recording at the same longitudinal position recorded in the cartridge memory approaches zero. The head tilt angle may be, for example, the angle θ described above.

The magnetic tape and the magnetic tape cartridge can be suitability used in a magnetic tape apparatus (in other words, a magnetic recording and reproducing system) that records and/or reproduces data at different head tilt angles. In such a magnetic tape apparatus, in one aspect, it is possible to record and/or reproduce the data by changing the head tilt angle during running of the magnetic tape. For example, the head tilt angle can be changed according to the information on the dimensions in the width direction of the magnetic tape acquired during running of the magnetic tape. There is also a use form, for example, in which the head tilt angle in one recording and/or reproduction and the head tilt angle in subsequent recording and/or reproduction are changed, and then the head tilt angle is fixed without change during running of the magnetic tape for each recording and/or reproduction.

Magnetic Tape Apparatus

Still another aspect of the present invention relates to a magnetic tape apparatus including the magnetic tape described above. In the magnetic tape apparatus, recording of data on the magnetic tape and/or reproduction of data recorded on the magnetic tape can be performed, for example, as the magnetic layer surface of the magnetic tape and the magnetic head come into contact with each other to be slid on each other.

In one aspect, the magnetic tape is treated as a removable medium (so-called replaceable medium), and a magnetic tape cartridge accommodating the magnetic tape therein is inserted into the magnetic tape apparatus and taken out. In another aspect, the magnetic tape is not treated as a replaceable medium, the magnetic tape is wound around the reel of the magnetic tape apparatus comprising a magnetic head, and the magnetic tape is accommodated in the magnetic tape apparatus.

In the present invention and the present specification, the term "magnetic tape apparatus" means an apparatus capable of performing at least one of the recording of data on the magnetic tape or the reproduction of data recorded on the magnetic tape. Such an apparatus is generally called a drive.

Magnetic Head

The magnetic tape apparatus may include a magnetic head. The configuration of the magnetic head and the angle θ, which is the head tilt angle, are as described above with reference to FIGS. 5 to 7. In a case where the magnetic head includes a reproducing element, a magnetoresistive (MR) element capable of sensitively reading information recorded on the magnetic tape is preferable as the reproducing element. As the MR element, various well-known MR elements (for example, a giant magnetoresistive (GMR) element and a tunnel magnetoresistive (TMR) element) can be used. Hereinafter, a magnetic head that records data and/or reproduces recorded data will also be referred to as a "recording and reproducing head". An element for recording data (recording element) and an element for reproducing data (reproducing element) are collectively referred to as a "magnetic head element".

In a case of recording data and/or reproducing recorded data, first, tracking using the servo signal can be performed. That is, by causing the servo signal reading element to follow a predetermined servo track, the magnetic head element can be controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

Figure 9:
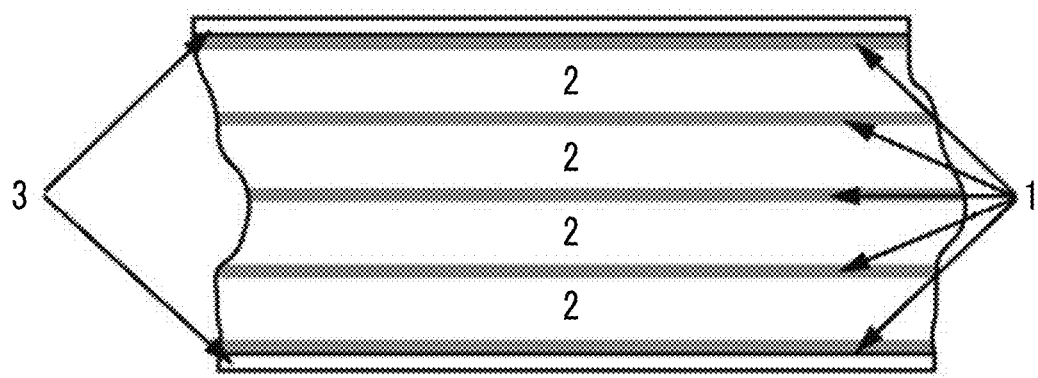
FIG. 9 shows an arrangement example of data bands and servo bands.
Figure 10:
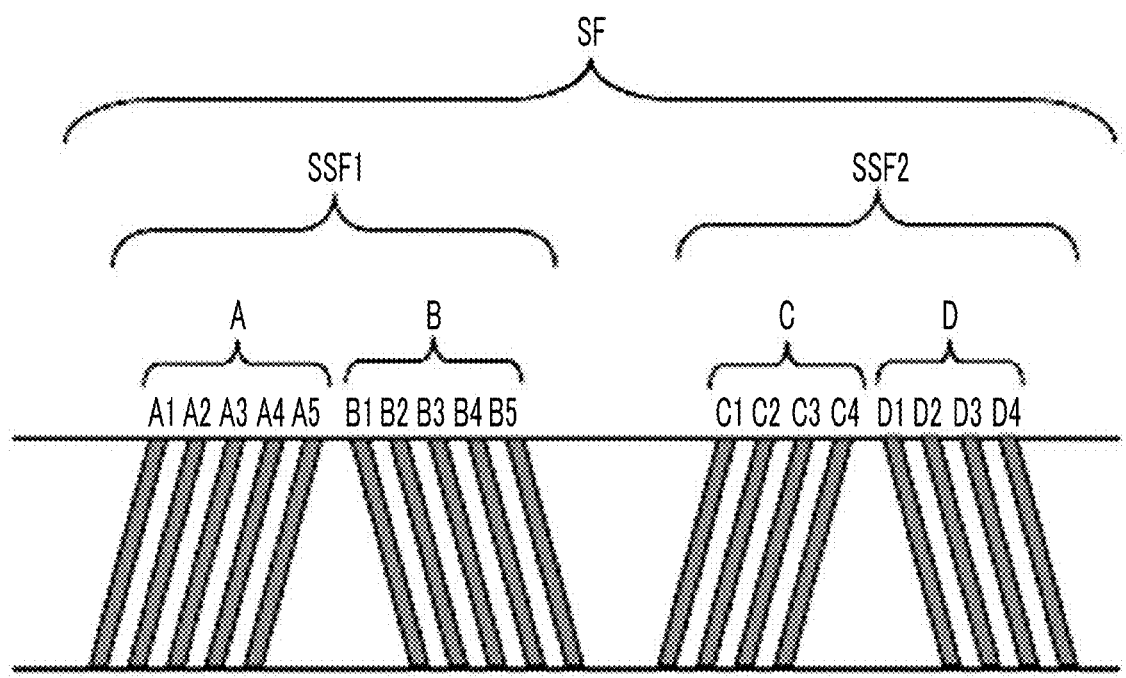
FIG. 10 shows an arrangement example of a servo pattern of a linear tape-open (LTO) Ultrium format tape.

FIG. 9 shows an arrangement example of data bands and servo bands. In FIG. 9, a plurality of servo bands 1 are arranged to be interposed between guide bands 3 in a magnetic layer of a magnetic tape MT. A plurality of regions 2 interposed between two servo bands are data bands. The servo pattern is a magnetization region, and is formed by magnetizing a specific region of the magnetic layer by the servo write head. A region magnetized by the servo write head (a position where the servo pattern is formed) is determined by the standard. For example, in an LTO Ultrium format tape which is based on a local standard, a plurality of servo patterns inclined with respect to a tape width direction as shown in FIG. 10 are formed on a servo band, in a case of manufacturing a magnetic tape. Specifically, in FIG. 10, a servo frame SF on the servo band 1 is composed of a servo sub-frame 1 (SSF1) and a servo sub-frame 2 (SSF2). The servo sub-frame 1 is composed of an A burst (in FIG. 10, reference numeral A) and a B burst (in FIG. 10, reference numeral B). The A burst is composed of servo patterns A1 to A5 and the B burst is composed of servo patterns B1 to B5. Meanwhile, the servo sub-frame 2 is composed of a C burst (in FIG. 10, reference numeral C) and a D burst (in FIG. 10, reference numeral D). The C burst is composed of servo patterns C1 to C4 and the D burst is composed of servo patterns D1 to D4. Such 18 servo patterns are arranged in the sub-frames in an array of 5, 5, 4, 4, as the sets of 5 servo patterns and 4 servo patterns, and are used for identifying the servo frames. FIG. 10 shows one servo frame for description. Note that, in practice, a plurality of the servo frames are arranged in the running direction in each servo band in the magnetic layer of the magnetic tape on which the head tracking of the timing-based servo system is performed. In FIG. 10, the arrow indicates the running direction of the magnetic tape. For example, an LTO Ultrium format tape usually has 5000 or more servo frames per 1 m of tape length in each servo band of the magnetic layer.

In one aspect, in the magnetic tape apparatus, the head tilt angle can be changed during running of the magnetic tape in the magnetic tape apparatus. The head tilt angle is, for example, an angle θ formed by the axis of the element array with respect to the width direction of the magnetic tape. The angle θ is as described above. For example, by providing the recording and reproducing head unit of the magnetic head with an angle adjustment unit for adjusting the angle of the module of the magnetic head, the angle θ can be variably adjusted during running of the magnetic tape. Such an angle adjustment unit can include, for example, a rotation mechanism for rotating the module. A well-known technology can be applied to the angle adjustment unit.

Regarding the head tilt angle during running of the magnetic tape, in a case where the magnetic head includes a plurality of modules, it is possible to specify the angle θ described with reference to FIGS. 5 to 7 for randomly selected modules. $\theta_{initial}$, which is an angle θ at the start of running of the magnetic tape, can be set to 0° or more or more than 0°. This is preferable in terms of adjustment ability to adjust the effective distance between the servo signal reading elements in response to the dimension change in the width direction of the magnetic tape, because the larger $\theta_{initial}$, the larger the amount of change in the effective distance between the servo signal reading elements with respect to the amount of change in the angle θ. From this point, $\theta_{initial}$ is preferably 1° or more, more preferably 5° or more, and still more preferably 10° or more. On the other hand, for an angle (generally referred to as "wrap angle") formed between the magnetic layer surface and the contact surface of the magnetic head in a case where the magnetic tape runs and comes into contact with the magnetic head, it is effective to keep the deviation with respect to the tape width direction small in order to improve the uniformity in the tape width direction of the friction generated by the contact between the magnetic head and the magnetic tape during running of the magnetic tape. In addition, it is desirable to increase the uniformity of the friction in the tape width direction from the viewpoint of the position followability and the running stability of the magnetic head. From the viewpoint of reducing the deviation of the wrap angle in the tape width direction, $\theta_{initial}$ is preferably 45° or less, more preferably 40° or less, and still more preferably 35° or less.

Regarding the change in angle θ during running of the magnetic tape, in a case where the angle θ of the magnetic head changes from $\theta_{initial}$ at the start of running while the magnetic tape runs in the magnetic tape apparatus for the recording of data on the magnetic tape and/or for the reproduction of data recorded on the magnetic tape, the maximum change amount Δθ of the angle θ during the running of the magnetic tape is the larger value between $\Delta\theta_{max}$ and $\Delta\theta_{min}$ calculated by the following equation. The maximum value of the angle θ during running of the magnetic tape is $\theta_{max}$, and the minimum value is $\theta_{min}$. Note that "max" is an abbreviation for maximum, and "min" is an abbreviation for minimum.

$$\Delta\theta_{max} = \theta_{max} - \theta_{initial}$$

$$\Delta\theta_{min} = \theta_{initial} - \theta_{min}$$

In one aspect, Δθ may be more than 0.000°, and, from the viewpoint of the adjustment ability to adjust the effective distance between the servo signal reading elements in response to the dimension change in the width direction of the magnetic tape, Δθ is preferably 0.001° or more and more preferably 0.010° or more. From the viewpoint of easiness of ensuring synchronization of the recorded data and/or the reproduced data between a plurality of magnetic head elements during the recording and/or reproduction of the data, Δθ is preferably 1.000° or less, more preferably 0.900° or less, still more preferably 0.800° or less, still more preferably 0.700° or less, and still more preferably 0.600° or less.

In the example shown in FIG. 6 and FIG. 7, the axis of the element array is tilted in the running direction of the magnetic tape. Note that the present invention is not limited to such an example. In the above-described magnetic tape apparatus, an embodiment in which the axis of the element array is tilted in a direction opposite to the running direction of the magnetic tape is also included in the present invention.

$\theta_{initial}$, which is the head tilt angle at the start of running of the magnetic tape, can be set by a control device of the magnetic tape apparatus or the like.

Figure 11:
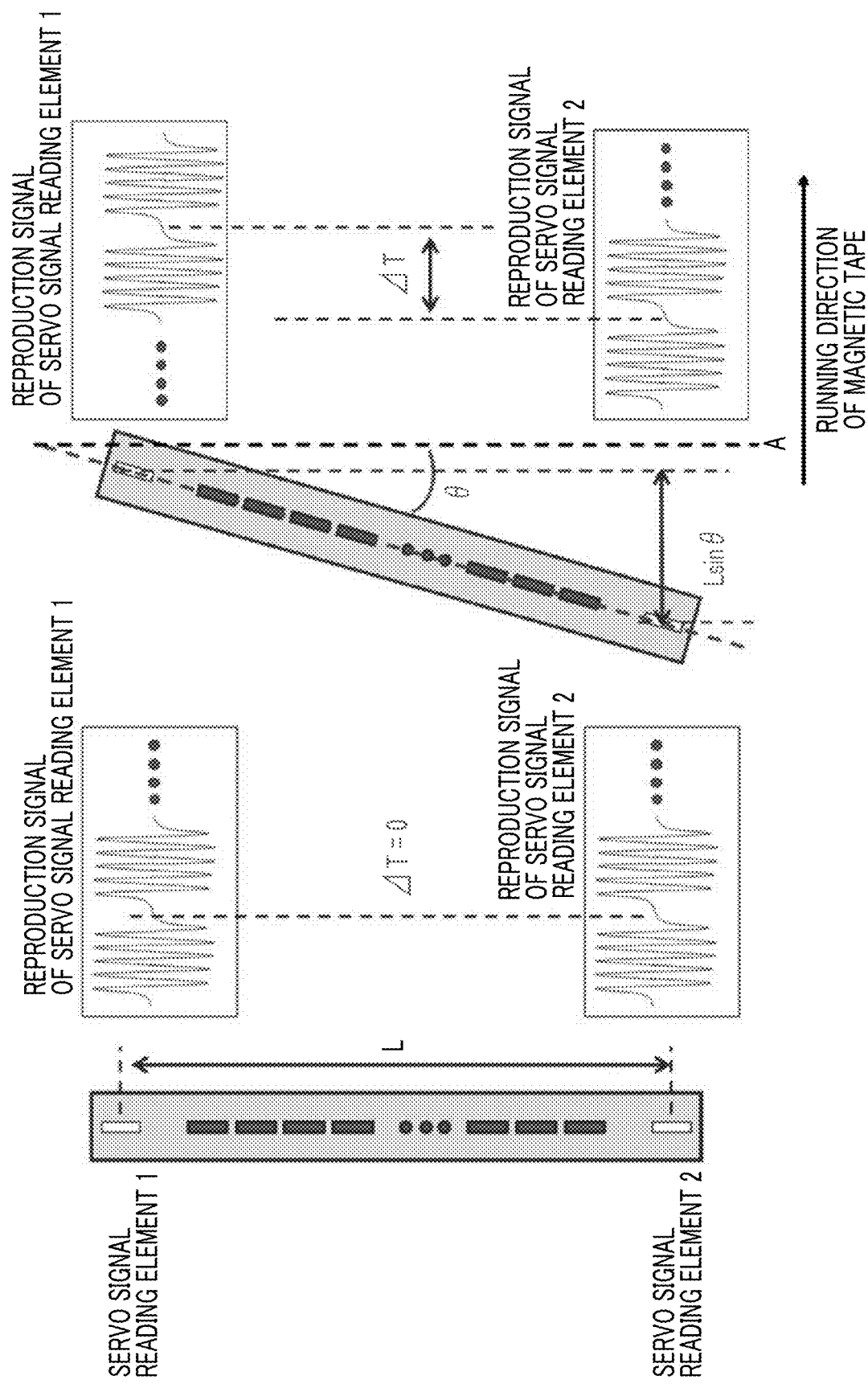
FIG. 11 is an explanatory diagram of a measuring method of an angle θ during magnetic tape running.

Regarding the head tilt angle during running of the magnetic tape, FIG. 11 is an explanatory diagram of a measuring method of the angle θ during running of the magnetic tape. The angle θ during running of the magnetic tape can be obtained, for example, by the following method. In a case where the angle θ during running of the magnetic tape is obtained by the following method, the angle θ is changed in a range of 0° to 90° during running of the magnetic tape. That is, in a case where the axis of the element array is tilted in the running direction of the magnetic tape at the start of running of the magnetic tape, the element array is not tilted such that the axis of the element array is tilted in the direction opposite to the running direction of the magnetic tape at the start of running of the magnetic tape, during running of magnetic tape, and in a case where the axis of the element array is tilted in the direction opposite to the running direction of the magnetic tape at the start of running of the magnetic tape, the element array is not tilted such that the axis of the element array is tilted in the running direction of the magnetic tape at the start of running of the magnetic tape, during running of the magnetic tape.

A phase difference (that is, a time difference) ΔT between the reproduction signals of the pair of servo signal reading elements 1 and 2 is measured. The measurement of ΔT can be performed by a measurement unit provided in the magnetic tape apparatus. A configuration of such a measurement unit is well-known. The distance L between the central portion of the servo signal reading element 1 and the central portion of the servo signal reading element 2 can be measured by an optical microscope or the like. In a case where the running speed of the magnetic tape is a speed v, the distance between the central portions of the two servo signal reading elements in the running direction of the magnetic tape is L sin θ, and a relationship of L sin θ=v×ΔT is established. Therefore, the angle θ during running of the magnetic tape can be calculated by the equation "θ=arcsin (vΔT/L)". The right figure of FIG. 11 shows an example in which the axis of the element array is tilted in the running direction of the magnetic tape. In this example, the phase difference (that is, the time difference) ΔT of the phase of the reproduction signal of the servo signal reading element 2 with respect to the phase of the reproduction signal of the servo signal reading element 1 is measured. In a case where the axis of the element array is tilted in the direction opposite to the running direction of the magnetic tape, θ can be obtained by the above-described method except for a point where ΔT is measured as the phase difference (that is, the time difference) of the phase of the reproduction signal of the servo signal reading element 1 with respect to the phase of the reproduction signal of the servo signal reading element 2.

A pitch suitable for a measurement pitch of the angle θ, that is, a measurement interval of the angle θ in the tape longitudinal direction can be selected according to a frequency of the tape width deformation in the tape longitudinal direction. As an example, the measurement pitch can be set to, for example, 250 μm.

Configuration of Magnetic Tape Apparatus

Figure 12:
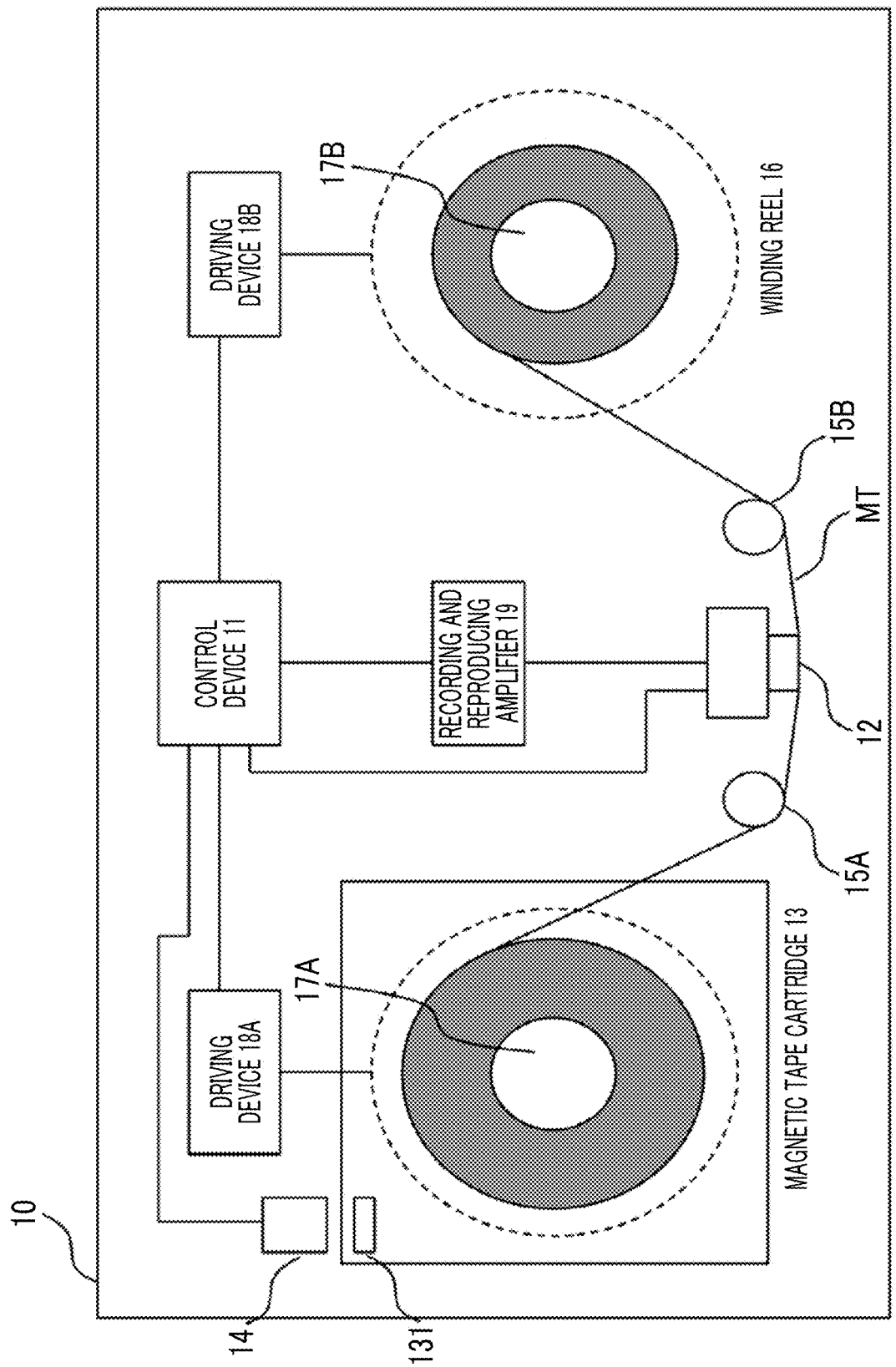
FIG. 12 is a schematic view showing an example of the magnetic tape apparatus.

A magnetic tape apparatus 10 shown in FIG. 12 controls a recording and reproducing head unit 12 in accordance with an instruction from a control device 11, and records and reproduces data on a magnetic tape MT.

The magnetic tape apparatus 10 has a configuration capable of detecting and adjusting the tension applied in the longitudinal direction of the magnetic tape from spindle motors 17A and 17B for controlling rotation of a magnetic tape cartridge reel and a winding reel and driving devices 18A and 18B thereof.

The magnetic tape apparatus 10 has a configuration capable of loading a magnetic tape cartridge 13.

The magnetic tape apparatus 10 has a cartridge memory reading and writing device 14 capable of reading and writing a cartridge memory 131 in the magnetic tape cartridge 13.

From the magnetic tape cartridge 13 mounted on the magnetic tape apparatus 10, an end part or a leader pin of the magnetic tape MT is pulled out by an automatic loading mechanism or a manual operation, and the magnetic layer surface of the magnetic tape MT passes on the recording and reproducing head through guide rollers 15A and 15B in a direction contacting with a recording and reproducing head surface of the recording and reproducing head unit 12, and thus the magnetic tape MT is wound around a winding reel 16.

The rotation and torque of the spindle motor 17A and the spindle motor 17B are controlled by a signal from the control device 11, and the magnetic tape MT is run at any speed and tension. A servo pattern formed in advance on the magnetic tape can be used for a control of the tape speed and a control of the head tilt angle. In order to detect the tension, a tension detecting mechanism may be provided between the magnetic tape cartridge 13 and the winding reel 16. The tension may be controlled by using the guide rollers 15A and 15B in addition to the control by the spindle motors 17A and 17B.

The cartridge memory reading and writing device 14 is configured to be capable of reading out and writing information in the cartridge memory 131 in response to an instruction from the control device 11. As a communication method between the cartridge memory reading and writing device 14 and the cartridge memory 131, for example, an international organization for standardization (ISO) 14443 method can be employed.

The control device 11 includes, for example, a controller, a storage unit, a communication unit, and the like.

The recording and reproducing head unit 12 includes, for example, a recording and reproducing head, a servo tracking actuator that adjusts a position of the recording and reproducing head in the track width direction, a recording and reproducing amplifier 19, a connector cable for connection with the control device 11, and the like. The recording and reproducing head includes, for example, a recording element for recording data on the magnetic tape, a reproducing element for reproducing data on the magnetic tape, and a servo signal reading element for reading a servo signal recorded on the magnetic tape. For example, one or more recording elements, reproducing elements, and servo signal reading elements are mounted in one magnetic head. Alternatively, each element may be separately provided in a plurality of magnetic heads according to the running direction of the magnetic tape.

The recording and reproducing head unit 12 is configured to be capable of recording data on the magnetic tape MT in response to an instruction from the control device 11. In addition, the recording and reproducing head unit 12 is configured to be capable of reproducing the data recorded on the magnetic tape MT in response to an instruction from the control device 11.

The control device 11 has a mechanism for obtaining the running position of the magnetic tape from the servo signal read from the servo band in a case where the magnetic tape MT is run, and controlling the servo tracking actuator such that the recording element and/or the reproducing element is located at a target running position (track position). The track position is controlled by feedback control, for example. The control device 11 has a mechanism for obtaining a servo band interval from servo signals read from two adjacent servo bands in a case where the magnetic tape MT is run. The control device 11 can store the obtained information on the servo band interval in the storage unit inside the control device 11, the cartridge memory 131, an external connection device, or the like. In addition, the control device 11 can change the head tilt angle according to the dimension information in the width direction of the magnetic tape during running. Accordingly, the effective distance between the servo signal reading elements can be made to approximate to or match with the interval between the servo bands. The dimension information can be acquired by using a servo pattern formed in advance on the magnetic tape. For example, in this way, during running of the magnetic tape in the magnetic tape apparatus, the angle θ formed by the axis of the element array with respect to the width direction of the magnetic tape can be changed according to the dimension information in the width direction of the magnetic tape acquired during running. The head tilt angle can be adjusted, for example, by feedback control. For example, the adjustment of the head tilt angle can also be performed by the method disclosed in JP2016-524774A or US2019/0164573A1.

EXAMPLES

Hereinafter, the present invention will be described based on Examples. Note that the present invention is not limited to the embodiments shown in Examples. "Parts" and "%" in the following description mean "parts by mass" and "mass %", respectively. The steps and evaluations in the following description were performed in an environment of a temperature of 23° C.±1° C., unless otherwise noted. "eq" in the following description is an equivalent and is a unit that cannot be converted into an SI unit.

Abrasive Solution 2,3-dihydroxynaphthalene (manufactured by Tokyo Chemical Industry Co., Ltd.) having the amount shown in Table 1, 31.3 parts of a 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed liquid of methyl ethyl ketone and cyclohexanone at 1:1 (mass ratio) as a solvent were mixed with respect to 100.0 parts of the abrasive (alumina powder) shown in Table 1, and dispersed in the presence of zirconia beads (bead diameter: 0.1 mm) by a paint shaker for the time (beads dispersion time) shown in Table 1.

After the dispersion, the dispersion liquid obtained by separating the dispersion liquid and the beads with a mesh was subjected to centrifugal separation. The centrifugal separation was carried out using CS150GXL manufactured by Koki Holdings Co., Ltd. (the rotor used is S100AT6 manufactured by Koki Holdings Co., Ltd.) as a centrifugal separator at the rotation speed (rotation per minute (rpm)) shown in Table 1 for the time (centrifugal separation time) shown in Table 1. By this centrifugal separation, particles having a relatively large particle size were sedimented, and particles having a relatively small particle size were dispersed in a supernatant solution.

After that, a supernatant solution was collected by decantation. In Examples and Comparative Examples described below, this collected solution was used as an abrasive solution. Before being used in the preparation of the composition for forming a magnetic layer, the abrasive solution was subjected to an ultrasonic dispersion treatment for 0.5 minutes by a batch type ultrasonic device (20 kHz, 300 W).

TABLE 1

| | | | Abrasive solution |
|---|---|---|---|
| Preparation of abrasive solution | Abrasive trade name (manufactured by Sumitomo Chemical Co., Ltd.) | | Hit80 |
| | BET specific surface area of abrasive ($m^2/g$) | | 30 |
| | Content of abrasive solution dispersing agent (2,3-dihydroxynaphthalene) | | 3.0 parts |
| | Beads dispersion time | | 360 minutes |
| | Centrifugal separation | Rotation speed | 5500 rpm |
| | | Centrifugal separation time | 4 minutes |

Ferromagnetic Powder

In Table 2, "BaFe" is a hexagonal barium ferrite powder (coercivity Hc: 196 kA/m, average particle size (average plate diameter) of 24 nm).

In Table 2, "SrFe1" is a hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to a glass bottle containing the product, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an in-furnace temperature of 110° C. for 6 hours to obtain a hexagonal strontium ferrite powder.

An average particle size of the hexagonal strontium ferrite powder obtained above was 18 nm, an activation volume was 902 nm$^3$, an anisotropy constant Ku was $2.2 \times 10^5$ J/m$^3$, and a mass magnetization σs was 49 A·m$^2$/kg.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees In Table 2, "SrFe2" is a hexagonal strontium ferrite powder manufactured by the following method.

1725 g of SrCO$_3$, 666 g of H$_3$BO$_3$, 1332 g of Fe$_2$O$_3$, 52 g of Al(OH)$_3$, 34 g of CaCO$_3$, and 141 g of BaCO$_3$ were weighed and mixed by a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the obtained amorphous body was charged into an electric furnace, was heated to 645° C. (crystallization temperature), and was held at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to a glass bottle containing the product, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an in-furnace temperature of 110° C. for 6 hours to obtain a hexagonal strontium ferrite powder.

An average particle size of the obtained hexagonal strontium ferrite powder was 19 nm, an activation volume was 1102 nm$^3$, an anisotropy constant Ku was $2.0 \times 10^5$ J/m$^3$, and a mass magnetization σs was 50 A·m$^2$/kg.

In Table 2, "ε-iron oxide" is an ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at an in-furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was added dropwise and was stirred for 24 hours. A powder sedimented by adding 50 g of ammonium sulfate to the obtained reaction solution was collected by centrifugal separation, was washed with pure water, and was dried in a heating furnace at an in-furnace temperature of 80° C. for 24 hours to obtain a ferromagnetic powder precursor.

The obtained ferromagnetic powder precursor was loaded into a heating furnace at an in-furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide ($\epsilon$-$Ga_{0.28}Co_{0.05}Ti_{0.05}Fe_{1.62}O_3$). In addition, X-ray diffraction analysis was performed under the same condition as that described above for SrFe1, and from a peak of an X-ray diffraction pattern, it was confirmed that the obtained ferromagnetic powder does not include α-phase and γ-phase crystal structures, and has a single-phase and ε-phase crystal structure (ε-iron oxide crystal structure).

The obtained ε-iron oxide powder had an average particle size of 12 nm, an activation volume of 746 $nm^3$, an anisotropy constant Ku of $1.2 \times 10^5$ $J/m^3$, and a mass magnetization σs of 16 $A \cdot m^2/kg$.

An activation volume and an anisotropy constant Ku of the above hexagonal strontium ferrite powder and ε-iron oxide powder are values obtained by the method described above using a vibrating sample magnetometer (manufactured by Toei Industry Co., Ltd.) for each ferromagnetic powder.

In addition, a mass magnetization σs is a value measured at a magnetic field intensity of 15 kOe using a vibrating sample magnetometer (manufactured by Toei Industry Co., Ltd.).

Non-Magnetic Powder of Magnetic Layer

In Examples and Comparative examples in which "Average plate diameter of non-magnetic powder" and "Average plate thickness of non-magnetic powder" are described in the column of "Magnetic layer" in Table 2, the magnetic layer was formed by using a non-magnetic powder composed of plate-shaped particles having an average plate diameter and an average plate thickness of values described in Table 2. The non-magnetic powder is a non-magnetic powder prepared by a method described below.

The metal hydroxide and water were mixed in an airtight container (mixing time and molar concentration of the metal hydroxide aqueous solution: see Table 2). The mixed aqueous solution was heated for 10 days in an autoclave of which an internal temperature was set to 270° C. After heating, the generated particles were collected by centrifugal separation.

In this way, the non-magnetic powder was prepared. An alumina powder was prepared by using aluminum hydroxide as the metal hydroxide, a zirconia powder was prepared by using zirconium hydroxide, and a ceria powder was prepared by using cerium hydroxide.

In Table 2, "CS" described in "Type of non-magnetic powder" in the column of "Magnetic layer" is an abbreviation of colloidal silica. The particle shape of the colloidal silica was spherical or elliptical.

The "Average plate diameter of non-magnetic powder", "Average plate thickness of non-magnetic powder", and "Average particle size of non-magnetic powder" described in the column of "Magnetic layer" in Table 2 are values obtained as described above by performing the measurement using a transmission electron microscope H-9000 manufactured by Hitachi, Ltd. as a transmission electron microscope and image analysis software KS-400 manufactured by Carl Zeiss as image analysis software.

Non-Magnetic Support

In Table 2, "PEN" indicates a polyethylene naphthalate support, and "PA" indicates an aromatic polyamide support.

Example 1

(1) Formulation of Composition for Forming Magnetic Layer

Magnetic Liquid
   Ferromagnetic powder (see Table 2): 100.0 parts
   $SO_3Na$ group-containing polyurethane resin: 14.0 parts
      Weight-average molecular weight: 70,000, $SO_3Na$ group: 0.4 meq/g
   Cyclohexanone: 150 parts
   Methyl ethyl ketone: 150 parts Abrasive Solution The abrasive solution prepared by the method described above was used in an amount such that the content of the abrasive contained in the abrasive solution was 0.80 parts with respect to 100.0 parts of ferromagnetic powder.

Non-Magnetic Powder
   Non-magnetic powder described in Table 2:0.2 parts

Other Components
   Stearic acid: 2.0 parts
   Butyl stearate: 10.0 parts
   Polyisocyanate (CORONATE manufactured by Nippon Polyurethane Co., Ltd.): 2.5 parts
   Cyclohexanone: 200.0 parts
   Methyl ethyl ketone: 200.0 parts (2) Formulation of Composition for Forming Non-Magnetic Layer
   α-Iron oxide powder (average particle volume: see Table 2): 100.0 parts
   Carbon black (average particle size: 20 nm, pH: see Table 2): 25.0 parts
   $SO_3Na$ group-containing polyurethane resin: 18 parts
      Weight-average molecular weight: 70,000, $SO_3Na$ group: 0.2 meq/g
   Stearic acid: 1.0 part
   Cyclohexanone: 300.0 parts
   Methyl ethyl ketone: 300.0 parts (3) Formulation of Composition for Forming Back Coating Layer
   Carbon black: 100.0 parts
   BP-800 manufactured by Cabot Corporation, average particle size: 17 nm
   $SO_3Na$ group-containing polyurethane resin ($SO_3Na$ group: 70 eq/ton): 20.0 parts
   $OSO_3K$ group-containing vinyl chloride resin ($OSO_3K$ group: 70 eq/ton): 30.0 parts
   Cyclohexanone: 140.0 parts
   Methyl ethyl ketone: 170.0 parts
   Butyl stearate: 2.0 parts
   Stearic acid amide: 0.1 parts (4) Preparation of Composition for Forming Each Layer The above-mentioned components of the magnetic liquid were dispersed for 24 hours using a batch type vertical sand mill to prepare a magnetic liquid. As dispersion beads, zirconia beads having a bead diameter of 0.5 mm were used.

The magnetic liquid and the abrasive solution were mixed with the above-mentioned non-magnetic powder and other components, and then subjected to a dispersion treatment using a batch type ultrasonic device (20 kHz, 300 W) (dispersion time: see Table 2). Thereafter, filtration was performed using a filter having a pore diameter of 0.5 µm to prepare a composition for forming a magnetic layer.

For the composition for forming a non-magnetic layer, the above-mentioned components were dispersed for 24 hours using a batch type vertical sand mill. As dispersion beads, zirconia beads having a bead diameter of 0.1 mm were used. The obtained dispersion liquid was filtered using a filter having a pore diameter of 0.5 µm to prepare a composition for forming a non-magnetic layer.

Regarding the composition for forming a back coating layer, the above-mentioned components were kneaded using a continuous kneader and then dispersed using a sand mill. 40.0 parts of polyisocyanate (CORONATE L manufactured by Nippon Polyurethane Industry Co., Ltd.) and 1000.0 parts of methyl ethyl ketone were added to the obtained dispersion liquid, and then the mixture was filtered using a filter having a pore diameter of 1 µm to prepare a composition for forming a back coating layer.

(5) Manufacture of Magnetic Tape

A magnetic tape was manufactured according to the manufacturing step shown in FIG. 8. The details are as follows.

A non-magnetic support, the type and the thickness of which are shown in Table 2, was fed from the feeding part, and the composition for forming a non-magnetic layer was applied onto one surface thereof so that the thickness after drying is 0.7 µm in the first coating part, to form a coating layer. The cooling step was performed by allowing the formed coating layer to pass through the cooling zone in which the atmosphere temperature was adjusted to 0° C. while the coating layer is in a wet state (cooling zone staying time: 1 second), and then the heating and drying step was performed by allowing the coating layer to pass through the first heat treatment zone with the drying temperature (atmosphere temperature, the same applies hereinafter) of 105° C., to form a non-magnetic layer.

After that, the composition for forming a magnetic layer prepared as described above was applied onto the non-magnetic layer so that the thickness after drying is 0.1 µm in the second coating part, to form a coating layer. The vertical alignment treatment was performed in the alignment zone by applying a magnetic field having a magnetic field intensity of 0.5 T onto the surface of the coating layer of the composition for forming a magnetic layer in the vertical direction while the coating layer is in a wet state, and then the coating layer was dried in the second heat treatment zone with the drying temperature of 105° C.

After that, in the third coating part, the composition for forming a back coating layer prepared as described above was applied onto the surface of the non-magnetic support opposite to the surface on which the non-magnetic layer and the magnetic layer are formed, so that the thickness after drying is 0.3 µm, to form a coating layer, and the formed coating layer was dried in the third heat treatment zone with the drying temperature of 105° C.

After that, a calendering treatment (surface smoothing treatment) was performed under the calendering treatment conditions shown in Table 2 using a calender roll composed of only a metal roll.

After that, a heat treatment was performed for 36 hours in an environment of an atmosphere temperature of 70° C. After the heat treatment, the resultant was slit to have ½ inches width to manufacture a magnetic tape.

A servo signal was recorded on the magnetic layer of the manufactured magnetic tape by a commercially available servo writer in a state where the magnetic layer was demagnetized, to obtain a magnetic tape having a data band, a servo band, and a guide band in an arrangement according to a linear tape-open (LTO) Ultrium format and having a servo pattern (timing-based servo pattern) in an arrangement and a shape according to the LTO Ultrium format on the servo band. The servo pattern thus formed is a servo pattern according to the description in Japanese industrial standards (JIS) X6175:2006 and Standard ECMA-319 (June 2001). The total number of servo bands is 5, and the total number of data bands is 4.

In this way, a magnetic tape (960 m in length) on which the servo signal was recorded was manufactured.

Examples 2 to 19 and Comparative Examples 1 to 11

A magnetic tape was obtained by the method described for Example 1 except that the items shown in Table 2 were changed as shown in Table 2.

For each of Examples and Comparative Examples, four magnetic tapes having a length of 960 m were manufactured, and each of which was used for evaluation of (1) to (4) below.

Evaluation Method (1) VIVA 0.1 of Magnetic Layer Surface and Width Direction σ of VIVA 0.1

The following conditions were adopted as the measurement conditions of the AFM, and VIVA 0.1 of the magnetic layer surface of the magnetic tape and the width direction σ of VIVA 0.1 were obtained by the method described above. As the AFM data analysis software, AFM data analysis software (Nanoscope Analysis) provided by BRUKER was used.

The region of the area of 40 µm×40 µm on the surface of the magnetic layer of the magnetic tape is measured with an AFM (Nanoscope 5 manufactured by BRUKER) in a peak fore-tapping mode. SCANASYST-AIR manufactured by BRUKER is used as a probe, a resolution is set to 512 pixels×512 pixels, and a scan speed is set to a speed at which one screen (512 pixels×512 pixels) is measured in 512 seconds.

(2) Non-Linear Component of Tape Width Deformation

For each magnetic tape of Examples and Comparative Examples, a non-linear component of tape width deformation generated by storage for 10 days in an environment of a temperature of 60° C. and a relative humidity of 20% was measured by the method described above.

(3) Total Thickness of Magnetic Tape (Tape Thickness)

Ten tape samples (5 cm in length) were cut out from any part of each magnetic tape of Examples and Comparative Examples, and these tape samples were stacked to measure the thickness. The thickness was measured using a digital thickness gauge of Millimar 1240 compact amplifier and Millimar 1301 induction probe manufactured by MARH Inc. A value (thickness per tape sample) obtained by dividing the measured thickness by ¹⁄₁₀ was defined as the tape thickness. The tape thickness of each of the magnetic tapes of Examples 1 to 16 and Comparative Examples 1 to 11 was 4.8 µm. The tape thickness of each of the magnetic tapes of Examples 17 to 19 are as follows. Example 17: 4.7 μm, Example 18: 4.1 μm, Example 19: 3.5 μm.

Regarding the thicknesses of the magnetic layer, the non-magnetic layer, the non-magnetic support, and the back coating layer of each of the magnetic tapes of Examples and Comparative Examples, cross-sectional observation was performed as described above, and it was confirmed that the respective thicknesses were the thicknesses described above or shown in Table 2.

(4) Recording and Reproducing Performance

The recording and reproducing performance of each magnetic tape of Examples and Comparative Examples was evaluated by the following method.

As the magnetic head, a magnetic head comprising a reproducing module including an element array with 10 channels or more of a reproducing element having a reproducing element width of 0.2 μm or less between a pair of servo signal reading elements, and a recording module including an element array with 10 channels or more of a recording element having a recording element width, which is equal to or more than 1.5 times the reproducing element width, between a pair of servo signal reading elements was used. In the element array, an interval between two adjacent elements (that is, two adjacent reproducing elements and two adjacent recording elements) in the head width direction was 40 μm or more.

The environment for recording and reproducing the data was such that a temperature is 20° C. to 25° C. and a relative humidity is 40% to 60%. Under such an environment, a magnetic tape apparatus in which the magnetic tape and the magnetic head were mounted to a tape transport system (reel tester) was placed for 24 hours or longer, and then data was recorded and reproduced. As a recording and reproducing amplifier to be mounted to the tape transport system of the magnetic tape apparatus, the recording and reproducing amplifier described above with respect to the measurement of the non-linear component of the tape width deformation was used. During the recording and reproduction of the data, the servo-following described above and the dynamic track position control (head tilt angle change) were executed. The recording and reproduction of the data were executed in detail as follows.

A signal was recorded by the recording element while the magnetic tape was run at a constant speed of 5 m/sec. As a bit sequence to be recorded, a 255-bit pseudo random bit sequence (PRBS) generated according to a generating polynomial $x^8+x^6+x^5+x^4+1$ was used. The symbol "^" represents a power. A linear recording density was set to 600 kbpi. The unit "kbpi" is a unit of the linear recording density (cannot be converted into an SI unit system). Single (shingled) recording of three or more tracks was performed such that a difference of (PES1+PES2)/2 between adjacent tracks was 1.5 times a reproduction track width.

A magnetization pattern recorded on the magnetic tape was reproduced by the reproducing element immediately after recording (that is, the reproducing element with the same channel number), and the signal was amplified by the reproducing amplifier. The reproduction signal was decoded into a bit sequence based on phase lock loop (PLL) and auto gain control (AGC) processing, followed by a data dependent noise predictive maximum likelihood (DD-NPML) signal processing. Bit-by-bit comparison was made between the recorded bit sequence and the reproduced and decoded bit sequence, and in a case where the bits were different from each other, one-bit-error was counted. Data comparison was made over 10 Mbit, and a value obtained by dividing the accumulated error bit count by 10 Mbit was defined as a bit error rate. It was confirmed that the reproduction signal immediately after recording had a bit error rate of 1/1000 or less in all channels.

Next, the magnetic tape was stored for 10 days in an environment of a temperature of 60° C. and a relative humidity of 20% in a state of being wound around a reel of the reel tester.

After the above-mentioned storage, the magnetic tape was taken out from the storage environment and placed 24 hours or longer in an environment of a temperature of 20° C. to 25° C. and a relative humidity of 40% to 60% while being mounted to the same magnetic tape apparatus as the magnetic tape apparatus used before the storage, and then the data track recorded before the storage was reproduced (no recording was performed) in the same environment. In this case, the reproduction was performed only on the data tracks in which the data tracks were recorded on both sides. The bit error rates of all the channels were calculated, and the recording and reproducing performance was evaluated according to the following evaluation standard, with channels with a bit error rate of 1/100 or higher regarded as defective channels.

Evaluation Standard

A: A ratio of the number of defective channels to the total number of channels was less than 5%.

B: A ratio of the number of defective channels to the total number of channels was 5% or more and less than 10%.

C: A ratio of the number of defective channels to the total number of channels was 10% or more.

The above results are shown in Table 2 (Tables 2-1 to 2-6).

TABLE 2

| | | Example 1 | Example 2 | Example 3 | Example 4 | Example 5 |
|---|---|---|---|---|---|---|
| Magnetic layer | Type of ferromagnetic powder | BaFe | BaFe | BaFe | BaFe | BaFe |
| | Type of non-magnetic powder | Alumina | Alumina | Alumina | Alumina | Zirconia |
| | Average particle size of non-magnetic powder | | | | | |
| | Average plate diameter of non-magnetic powder | 1000 nm | 500 nm | 500 nm | 50 nm | 1000 nm |
| | Average plate thickness of non-magnetic powder | 12 nm | 12 nm | 7 nm | 7 nm | 12 nm |
| | Molar concentration of metal hydroxide aqueous solution | 0.75 mol/L | 0.50 mol/L | 0.50 mol/L | 0.10 mol/L | 0.75 mol/L |
| | Mixing time of metal hydroxide and water | 3 h | 3 h | 5 h | 5 h | 3 h |

TABLE 2-continued

|  |  |  |  |  |  |  |
|---|---|---|---|---|---|---|
| Non-magnetic layer | Dispersion time | 1 h | 1 h | 2 h | 2 h | 1 h |
|  | α-Iron oxide powder Average particle volume (μm³) | $2.0 \times 10^{-6}$ | $2.0 \times 10^{-6}$ | $2.0 \times 10^{-6}$ | $2.0 \times 10^{-6}$ | $2.0 \times 10^{-6}$ |
|  | Carbon black pH | 9.0 | 9.0 | 9.0 | 9.0 | 9.0 |
| Non-magnetic support | Type | PEN | PEN | PEN | PEN | PEN |
|  | Thickness | 3.7 μm | 3.7 μm | 3.7 μm | 3.7 μm | 3.7 μm |
| Calendering treatment condition | Temperature | 100° C. | 100° C. | 100° C. | 100° C. | 100° C. |
|  | Linear pressure | 320 kN/m | 320 kN/m | 320 kN/m | 320 kN/m | 320 kN/m |
|  | Speed | 70 m/min | 70 m/min | 70 m/min | 70 m/min | 70 m/min |
| VIVA 0.1 | Unit: nm | 10 | 7 | 7 | 5 | 10 |
| Width direction σ of VIVA 0.1 | Unit: nm | 1.0 | 0.8 | 0.8 | 0.5 | 1.0 |
| Non-linear component of tape width deformation | Unit: nm | 70 | 70 | 60 | 45 | 70 |
| Recording and reproducing performance |  | B | B | B | A | B |

|  |  | Example 6 | Example 7 | Example 8 | Example 9 | Example 10 |
|---|---|---|---|---|---|---|
| Magnetic layer | Type of ferromagnetic powder | BaFe | BaFe | BaFe | BaFe | BaFe |
|  | Type of non-magnetic powder | Zirconia | Zirconia | Zirconia | Ceria | Ceria |
|  | Average particle size of non-magnetic powder |  |  |  |  |  |
|  | Average plate diameter of non-magnetic powder | 500 nm | 500 nm | 50 nm | 1000 nm | 500 nm |
|  | Average plate thickness of non-magnetic powder | 12 nm | 7 nm | 7 nm | 12 nm | 12 nm |
|  | Molar concentration of metal hydroxide aqueous solution | 0.50 mol/L | 0.50 mol/L | 0.10 mol/L | 0.75 mol/L | 0.50 mol/L |
|  | Mixing time of metal hydroxide and water | 3 h | 5 h | 5 h | 3 h | 3 h |
|  | Dispersion time | 1 h | 2 h | 2 h | 1 h | 1 h |
| Non-magnetic layer | α-Iron oxide powder Average particle volume (μm³) | $2.0 \times 10^{-6}$ | $2.0 \times 10^{-6}$ | $2.0 \times 10^{-6}$ | $2.0 \times 10^{-6}$ | $2.0 \times 10^{-6}$ |
|  | Carbon black pH | 9.0 | 9.0 | 9.0 | 9.0 | 9.0 |
| Non-magnetic support | Type | PEN | PEN | PEN | PEN | PEN |
|  | Thickness | 3.7 μm | 3.7 μm | 3.7 μm | 3.7 μm | 3.7 μm |
| Calendering treatment condition | Temperature | 100° C. | 100° C. | 100° C. | 100° C. | 100° C. |
|  | Linear pressure | 320 kN/m | 320 kN/m | 320 kN/m | 320 kN/m | 320 kN/m |
|  | Speed | 70 m/min | 70 m/min | 70 m/min | 70 m/min | 70 m/min |
| VIVA 0.1 | Unit: nm | 7 | 7 | 5 | 10 | 7 |
| Width direction σ of VIVA 0.1 | Unit: nm | 0.8 | 0.8 | 0.5 | 1.0 | 0.8 |
| Non-linear component of tape width deformation | Unit: nm | 70 | 60 | 45 | 70 | 70 |
| Recording and reproducing performance |  | B | B | A | B | B |

|  |  | Example 11 | Example 12 | Example 13 | Example 14 | Example 15 |
|---|---|---|---|---|---|---|
| Magnetic layer | Type of ferromagnetic powder | BaFe | BaFe | BaFe | SrFe1 | SrFe2 |
|  | Type of non-magnetic powder | Ceria | Ceria | Ceria | Alumina | Alumina |
|  | Average particle size of non-magnetic powder |  |  |  |  |  |
|  | Average plate diameter of non-magnetic powder | 500 nm | 50 nm | 50 nm | 1000 nm | 1000 nm |
|  | Average plate thickness of non-magnetic powder | 7 nm | 7 nm | 7 nm | 12 nm | 12 nm |
|  | Molar concentration of metal hydroxide aqueous solution | 0.50 mol/L | 0.10 mol/L | 0.10 mol/L | 0.75 mol/L | 0.75 mol/L |
|  | Mixing time of metal hydroxide and water | 5 h | 5 h | 5 h | 3 h | 3 h |
|  | Dispersion time | 2 h | 2 h | 6 h | 1 h | 1 h |
| Non-magnetic layer | α-Iron oxide powder Average particle volume (μm³) | $2.0 \times 10^{-6}$ | $2.0 \times 10^{-6}$ | $2.0 \times 10^{-6}$ | $2.0 \times 10^{-6}$ | $2.0 \times 10^{-6}$ |
|  | Carbon black pH | 9.0 | 9.0 | 9.0 | 9.0 | 9.0 |
| Non-magnetic support | Type | PEN | PEN | PEN | PEN | PEN |
|  | Thickness | 3.7 μm | 3.7 μm | 3.7 μm | 3.7 μm | 3.7 μm |
| Calendering treatment condition | Temperature | 100° C. | 100° C. | 100° C. | 100° C. | 100° C. |
|  | Linear pressure | 320 kN/m | 320 kN/m | 320 kN/m | 320 kN/m | 320 kN/m |
|  | Speed | 70 m/min | 70 m/min | 70 m/min | 70 m/min | 70 m/min |
| VIVA 0.1 | Unit: nm | 7 | 5 | 5 | 10 | 10 |
| Width direction σ of VIVA 0.1 | Unit: nm | 0.8 | 0.5 | 0.2 | 1.0 | 1.0 |

TABLE 2-continued

|  |  |  |  |  |  |  |
|---|---|---|---|---|---|---|
| Non-linear component of tape width deformation | Unit: nm | 60 | 45 | 25 | 70 | 70 |
| Recording and reproducing performance |  | B | A | A | B | B |

|  |  | Example 16 | Example 17 | Example 18 | Example 19 |
|---|---|---|---|---|---|
| Magnetic layer | Type of ferromagnetic powder | ε-Iron oxide | BaFe | BaFe | BaFe |
|  | Type of non-magnetic powder | Alumina | Alumina | Alumina | Alumina |
|  | Average particle size of non-magnetic powder |  |  |  |  |
|  | Average plate diameter of non-magnetic powder | 1000 nm | 1000 nm | 1000 nm | 1000 nm |
|  | Average plate thickness of non-magnetic powder | 12 nm | 12 nm | 12 nm | 12 nm |
|  | Molar concentration of metal hydroxide aqueous solution | 0.75 mol/L | 0.75 mol/L | 0.75 mol/L | 0.75 mol/L |
|  | Mixing time of metal hydroxide and water | 3 h | 3 h | 3 h | 3 h |
|  | Dispersion time | 1 h | 1 h | 1 h | 1 h |
| Non-magnetic layer | α-Iron oxide powder Average particle volume (μm$^3$) | $2.0 \times 10^{-6}$ | $2.0 \times 10^{-6}$ | $2.0 \times 10^{-6}$ | $2.0 \times 10^{-6}$ |
|  | Carbon black pH | 9.0 | 9.0 | 9.0 | 9.0 |
| Non-magnetic support | Type | PEN | PA | PA | PA |
|  | Thickness | 3.7 μm | 3.6 μm | 3.0 μm | 2.4 μm |
| Calendering treatment condition | Temperature | 100° C. | 100° C. | 100° C. | 100° C. |
|  | Linear pressure | 320 kN/m | 320 kN/m | 320 kN/m | 320 kN/m |
|  | Speed | 70 m/min | 70 m/min | 70 m/min | 70 m/min |
| VIVA 0.1 | Unit: nm | 10 | 10 | 10 | 10 |
| Width direction σ of VIVA 0.1 | Unit: nm | 1.0 | 1.0 | 1.0 | 1.0 |
| Non-linear component of tape width deformation | Unit: nm | 70 | 70 | 70 | 70 |
| Recording and reproducing performance |  | B | B | B | B |

|  |  | Comparative Example 1 | Comparative Example 2 | Comparative Example 3 | Comparative Example 4 | Comparative Example 5 |
|---|---|---|---|---|---|---|
| Magnetic layer | Type of ferromagnetic powder | BaFe | BaFe | BaFe | BaFe | BaFe |
|  | Type of non-magnetic powder | CS | CS | CS | Alumina | Alumina |
|  | Average particle size of non-magnetic powder | 100 nm | 100 nm | 50 nm |  |  |
|  | Average plate diameter of non-magnetic powder |  |  |  | 3000 nm | 1000 nm |
|  | Average plate thickness of non-magnetic powder |  |  |  | 100 nm | 15 nm |
|  | Molar concentration of metal hydroxide aqueous solution |  |  |  | 1.00 mol/L | 0.75 mol/L |
|  | Mixing time of metal hydroxide and water |  |  |  | 0.1 h | 1 h |
|  | Dispersion time | 0.5 h | 1 h | 2 h | 1 h | 1 h |
| Non-magnetic layer | α-Iron oxide powder Average particle volume (μm$^3$) | $2.5 \times 10^{-6}$ | $2.5 \times 10^{-6}$ | $2.5 \times 10^{-6}$ | $2.5 \times 10^{-6}$ | $2.5 \times 10^{-6}$ |
|  | Carbon black pH | 11.0 | 11.0 | 11.0 | 11.0 | 11.0 |
| Non-magnetic support | Type | PEN | PEN | PEN | PEN | PEN |
|  | Thickness | 3.7 μm | 3.7 μm | 3.7 μm | 3.7 μm | 3.7 μm |
| Calendering treatment condition | Temperature | 90° C. | 90° C. | 90° C. | 90° C. | 90° C. |
|  | Linear pressure | 294 kN/m | 294 kN/m | 294 kN/m | 294 kN/m | 294 kN/m |
|  | Speed | 80 m/min | 80 m/min | 80 m/min | 80 m/min | 80 m/min |
| VIVA 0.1 | Unit: nm | 30 | 20 | 15 | 10 | 7 |
| Width direction σ of VIVA 0.1 | Unit: nm | 2.0 | 2.0 | 2.0 | 1.5 | 1.5 |
| Non-linear component of tape width deformation | Unit: nm | 200 | 150 | 130 | 125 | 120 |
| Recording and reproducing performance |  | C | C | C | C | C |

TABLE 2-continued

| | | Comparative Example 6 | Comparative Example 7 | Comparative Example 8 | Comparative Example 9 | Comparative Example 10 | Comparative Example 11 |
|---|---|---|---|---|---|---|---|
| Magnetic layer | Type of ferromagnetic powder | BaFe | BaFe | BaFe | BaFe | BaFe | BaFe |
| | Type of non-magnetic powder | Alumina | CS | CS | CS | Alumina | Alumina |
| | Average particle size of non-magnetic powder | | 100 nm | 100 nm | 50 nm | | |
| | Average plate diameter of non-magnetic powder | 40 nm | | | | 40 nm | 40 nm |
| | Average plate thickness of non-magnetic powder | 12 nm | | | | 7 nm | 7 nm |
| | Molar concentration of metal hydroxide aqueous solution | 0.075 mol/L | | | | 0.075 mol/L | 0.075 mol/L |
| | Mixing time of metal hydroxide and water | 3 h | | | | 5 h | 5 h |
| | Dispersion time | 2 h | 0.5 h | 1 h | 2 h | 10 h | 15 h |
| Non-magnetic layer | α-Iron oxide powder Average particle volume (μm³) | $2.5 \times 10^{-6}$ | $1.0 \times 10^{-6}$ | $1.0 \times 10^{-6}$ | $1.0 \times 10^{-6}$ | $1.0 \times 10^{-6}$ | $1.0 \times 10^{-6}$ |
| | Carbon black pH | 11.0 | 8.0 | 8.0 | 8.0 | 8.0 | 8.0 |
| Non-magnetic support | Type | PEN | PEN | PEN | PEN | PEN | PEN |
| | Thickness | 3.7 μm | 3.7 μm | 3.7 μm | 3.7 μm | 3.7 μm | 3.7 μm |
| Calendering treatment condition | Temperature | 90° C. | 90° C. | 90° C. | 90° C. | 90° C. | 90° C. |
| | Linear pressure | 294 kN/m | 294 kN/m | 294 kN/m | 294 kN/m | 294 kN/m | PEN |
| | Speed | 80 m/min | 80 m/min | 80 m/min | 80 m/min | 80 m/min | 3.7 am |
| VIVA 0.1 | Unit: nm | 5 | 30 | 20 | 15 | 4 | 3 |
| Width direction σ of VIVA 0.1 | Unit: nm | 1.5 | 0.5 | 0.5 | 0.5 | 0.5 | 0.3 |
| Non-linear component of tape width deformation | Unit: nm | 118 | 1105 | 105 | 102 | 110 | 105 |
| Recording and reproducing performance | | C | C | C | C | C | C |

As shown in Table 2, the magnetic tapes of Examples showed superior recording and reproducing performance after being stored in an accelerated environment equivalent to long-term storage as compared with the magnetic tapes of Comparative Examples. From this result, it can be confirmed that the magnetic tapes of Examples contributed to the improvement of the operational stability of the drive (magnetic tape apparatus).

A magnetic tape was manufactured by the method described in Example 1, except that the vertical alignment treatment was not performed in a case of manufacturing the magnetic tape.

A sample piece was cut out from the magnetic tape. For this sample piece, a vertical squareness ratio obtained by the method described above using a TM-TRVSM5050-SMSL type manufactured by Tamakawa Co., Ltd. as a vibrating sample magnetometer was 0.55.

The vertical squareness ratio similarly obtained for the sample piece cut out from the magnetic tape of Example 1 was 0.65.

Each of the above two magnetic tapes was mounted to a reel tester of ½ inches, and electromagnetic conversion characteristics (signal-to-noise ratio (SNR)) were evaluated by the following method. As a result, for the magnetic tape of Example 1, a value of SNR higher by 4 dB was obtained as compared with the magnetic tape manufactured without the vertical alignment treatment.

In an environment of a temperature of 23° C. and a relative humidity of 50%, a tension of 0.7 N (Newton) was applied in the longitudinal direction of the magnetic tape, and recording and reproduction were performed for 10 passes. A relative speed between the magnetic tape and the magnetic head was set to 6 m/sec, and recording was performed by using a metal-in-gap (MIG) head (a gap length of 0.15 μm and a track width of 1.0 μm) as a recording head and setting a recording current to an optimal recording current of each magnetic tape. Reproduction was performed by using a giant-magnetoresistive (GMR) head (an element thickness of 15 nm, a shield interval of 0.1 μm, and a reproducing element width of 0.8 μm) as a reproducing head. The head tilt angle was set to 0°. A signal having a linear recording density of 300 kfci was recorded, and measurement regarding a reproduction signal was performed with a spectrum analyzer manufactured by Shibasoku Co., Ltd. The unit kfci is a unit of a linear recording density (cannot be converted into an SI unit system). As the signal, a portion where the signal was sufficiently stable after start of the running of the magnetic tape was used.

One aspect of the present invention is useful in various data storage technical fields.

What is claimed is:

1. A magnetic tape comprising:
    a non-magnetic support; and
    a magnetic layer containing a ferromagnetic powder,
    wherein VIVA 0.1, which is a height that is obtained by measuring a surface of the magnetic layer with an atomic force microscope and at which a cross-sectional area is 0.1% with a measurement region area as 100%, is 5 nm or more and 10 nm or less, and
    standard deviation σ of the VIVA 0.1 in a width direction of the surface of the magnetic layer is 1.0 nm or less.
2. The magnetic tape according to claim 1,
    wherein the standard deviation σ of the VIVA 0.1 is 0.7 nm or less.
3. The magnetic tape according to claim 1,
    wherein the magnetic layer further contains a non-magnetic powder having an average plate diameter of 50 nm or more and 1,000 nm or less and an average plate thickness of 12 nm or less.

4. The magnetic tape according to claim 1, further comprising:
a non-magnetic layer containing a non-magnetic powder between the non-magnetic support and the magnetic layer.

5. The magnetic tape according to claim 4,
wherein the non-magnetic powder of the non-magnetic layer includes an Fe-based inorganic oxide powder having an average particle volume of $2.0 \times 10^{-6}$ μm$^3$ or less.

6. The magnetic tape according to claim 4,
wherein the non-magnetic powder of the non-magnetic layer includes carbon black having a pH of 9.0 or less.

7. The magnetic tape according to claim 4,
wherein a thickness of the non-magnetic layer is 0.1 μm or more and 0.7 μm or less.

8. The magnetic tape according to claim 1, further comprising:
a back coating layer containing a non-magnetic powder on a surface side of the non-magnetic support opposite to a surface side having the magnetic layer.

9. The magnetic tape according to claim 1,
wherein a tape thickness is 5.2 μm or less.

10. The magnetic tape according to claim 1,
wherein a tape thickness is 5.0 μm or less.

11. The magnetic tape according to claim 1,
wherein a vertical squareness ratio of the magnetic tape is 0.60 or more.

12. The magnetic tape according to claim 1,
wherein a vertical squareness ratio of the magnetic tape is 0.65 or more.

13. The magnetic tape according to claim 1,
wherein the non-magnetic support is an aromatic polyamide support.

14. The magnetic tape according to claim 1,
wherein the standard deviation σ of the VIVA 0.1 is 0.7 nm or less,
the magnetic layer further contains a non-magnetic powder having an average plate diameter of 50 nm or more and 1,000 nm or less and an average plate thickness of 12 nm or less,
the magnetic tape further includes a non-magnetic layer containing a non-magnetic powder between the non-magnetic support and the magnetic layer,
the non-magnetic powder of the non-magnetic layer includes an Fe-based inorganic oxide powder having an average particle volume of $2.0 \times 10^{-6}$ μm$^3$ or less and carbon black having a pH of 9.0 or less,
a thickness of the non-magnetic layer is 0.1 μm or more and 0.7 μm or less,
the magnetic tape further includes a back coating layer containing a non-magnetic powder on a surface side of the non-magnetic support opposite to a surface side having the magnetic layer,
a tape thickness is 5.0 μm or less, and
a vertical squareness ratio of the magnetic tape is 0.65 or more.

15. A magnetic tape cartridge comprising:
the magnetic tape according to claim 1.

16. A magnetic tape apparatus comprising:
the magnetic tape according to claim 1.

17. The magnetic tape apparatus according to claim 16, further comprising:
a magnetic head,
wherein the magnetic head has a module including an element array with a plurality of magnetic head elements between a pair of servo signal reading elements, and
the magnetic tape apparatus changes an angle θ formed by an axis of the element array with respect to a width direction of the magnetic tape during running of the magnetic tape in the magnetic tape apparatus.

\* \* \* \* \*